United States Patent
Kim et al.

(10) Patent No.: US 8,917,684 B2
(45) Date of Patent: Dec. 23, 2014

(54) METHOD AND APPARATUS FOR SUPPORTING MULTIPLE FREQUENCY BANDS EFFICIENTLY IN MOBILE COMMUNICATION SYSTEM

(75) Inventors: Sangbum Kim, Suwon-si (KR); Gert-Jan Van Lieshout, Staines (GB); Soenghun Kim, Yongin-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 13/587,341

(22) Filed: Aug. 16, 2012

(65) Prior Publication Data

US 2013/0044708 A1   Feb. 21, 2013

Related U.S. Application Data

(60) Provisional application No. 61/524,000, filed on Aug. 16, 2011.

(51) Int. Cl.
| | | |
|---|---|---|
| H04W 4/00 | (2009.01) | |
| H04W 12/02 | (2009.01) | |
| H04W 4/06 | (2009.01) | |
| H04W 72/00 | (2009.01) | |
| H04W 76/00 | (2009.01) | |
| H04L 12/18 | (2006.01) | |
| H04L 29/06 | (2006.01) | |
| H04N 21/61 | (2011.01) | |
| H04N 21/6405 | (2011.01) | |
| H04W 76/02 | (2009.01) | |
| H04W 28/06 | (2009.01) | |
| H04W 74/08 | (2009.01) | |
| H04W 80/02 | (2009.01) | |

(52) U.S. Cl.
CPC ............... *H04W 12/02* (2013.01); *H04W 4/06* (2013.01); *H04W 72/005* (2013.01); *H04W 76/002* (2013.01); *H04L 12/189* (2013.01); *H04L 65/4076* (2013.01); *H04N 21/6131* (2013.01); *H04N 21/6405* (2013.01); *H04W 76/022* (2013.01); *H04W 28/06* (2013.01); *H04W 74/08* (2013.01); *H04W 80/02* (2013.01)
USPC .......................................... 370/329; 370/341

(58) Field of Classification Search
None
See application file for complete search history.

(56) References Cited

U.S. PATENT DOCUMENTS

| | | | |
|---|---|---|---|
| 2008/0130588 A1 | 6/2008 | Jeong et al. | |
| 2009/0262681 A1 | 10/2009 | Park et al. | |
| 2009/0323607 A1 | 12/2009 | Park et al. | |
| 2010/0075679 A1* | 3/2010 | Tenny et al. | 455/436 |
| 2011/0032889 A1 | 2/2011 | Lee et al. | |
| 2012/0082088 A1* | 4/2012 | Dalsgaard et al. | 370/315 |
| 2012/0155324 A1* | 6/2012 | Janakiraman et al. | 370/254 |
| 2012/0163296 A1* | 6/2012 | Cheon et al. | 370/328 |
| 2012/0182912 A1* | 7/2012 | Watfa et al. | 370/311 |
| 2013/0017779 A1* | 1/2013 | Song et al. | 455/39 |

(Continued)

*Primary Examiner* — Chi H Pham
*Assistant Examiner* — Soon-Dong D Hyun
(74) *Attorney, Agent, or Firm* — Jefferson IP Law, LLP

(57) ABSTRACT

A method and an apparatus for transmitting a small size data packet efficiently while reducing signaling overhead in a mobile communication system are provided. The method includes determining to apply a low security transfer procedure, transmitting, to a base station, a Radio Resource Control (RRC) connection request message including a temporary Data Radio Bearer (DRB) request to which Access Stratum (AS) security is not applied, receiving an RRC connection setup message, including a temporary DRB configuration, from the base station, and transmitting an Internet Protocol (IP) packet over the temporary DRB.

20 Claims, 25 Drawing Sheets

(56) References Cited

U.S. PATENT DOCUMENTS

| | | | |
|---|---|---|---|
| 2013/0203382 A1* | 8/2013 | Takahashi et al. | 455/410 |
| 2013/0235803 A1* | 9/2013 | Yi et al. | 370/328 |
| 2013/0308545 A1* | 11/2013 | Lee et al. | 370/328 |
| 2013/0324141 A1* | 12/2013 | Jung et al. | 455/450 |

* cited by examiner

METHOD AND APPARATUS FOR SUPPORTING MULTIPLE FREQUENCY BANDS EFFICIENTLY IN MOBILE COMMUNICATION SYSTEM

PRIORITY

This application claims the benefit under 35 U.S.C. §119(e) of a U.S. provisional patent application filed on Aug. 16, 2011 in the United States Intellectual Property Office and assigned Ser. No. 61/524,000, the entire disclosure of which is hereby incorporated by reference.

BACKGROUND OF THE INVENTION

1. Field of the Invention

The present invention relates to a mobile communication system. More particularly, the present invention relates to a method and an apparatus for transmitting a small size data packet efficiently while reducing signaling overhead in a mobile communication system.

2. Description of the Related Art

Mobile communication systems provide subscribers with voice communication services on the move. With technological advancements, mobile communication systems have evolved to support high speed data communication services as well as the standard voice communication services.

Recently, as one of the next generation mobile communication system, Long Term Evolution (LTE) is standardized by the 3rd Generation Partnership Project (3GPP). LTE is a technology designed to provide high speed packet-based communication of up to 100 Mbps and standardized almost completely now with the aim at commercial deployment in the near future.

The commercialization of diverse packet services creates an environment in which a small size packet occurs sporadically. In a mobile communication system, such as LTE, it is inevitable to configure a signaling connection and data bearer to transmit the packets even though the packet is so small in size. Such configuration procedure requires frequent message exchange and thus, as the number of terminals performing connection establishment procedure for small size data transmission/reception increases, the frequent control message exchange causes significant network overload and degradation of battery performance of the terminal.

Therefore, a need exists for a method and an apparatus for transmitting a small size data packet efficiently while reducing signaling overhead in a mobile communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method and an apparatus for transmitting a small size data packet occurring sporadically while reducing the signaling overhead.

In accordance with an aspect of the present invention, a data transmission method of a terminal is provided. The method includes determining to apply a low security transfer procedure, transmitting, to a base station, a Radio Resource Control (RRC) connection request message including a temporary Data Radio Bearer (DRB) request to which Access Stratum (AS) security is not applied, receiving an RRC connection setup message, including a temporary DRB configuration, from the base station, and transmitting an Internet Protocol (IP) packet over the temporary DRB.

In accordance with another aspect of the present invention, a data transmission method of a terminal is provided. The method includes determining to apply a low security transfer procedure, transmitting a Random Access Preamble to a base station, receiving a Random Access Response (RAR) message from the base station, and transmitting an IP packet through a Media Access Control (MAC) Protocol Data Unit (PDU) including separated UP PDU to the base station.

In accordance with another aspect of the present invention, a data reception method of a base station is provided. The method includes receiving an RRC connection request message including a temporary DRB request to which AS security is not applied from a terminal, transmitting an RRC connection setup message including a temporary DRB configuration to the terminal, and receiving an IP packet transmitted by the UE over the temporary DRB.

In accordance with another aspect of the present invention, a data reception method of a base station is provided. The method includes receiving a Random Access Preamble from a terminal, transmitting an RAR message to the terminal, and receiving an IP packet through a MAC PDU including separated UP PDU.

In accordance with another aspect of the present invention, a terminal for transmitting is provided. The terminal includes a transceiver for communicating signals with a base station, and a controller for determining to apply a low security transfer procedure, for transmitting to a base station an RRC connection request message including a temporary DRB request to which AS security is not applied, for receiving an RRC connection setup message including a temporary DRB configuration from the base station, and for transmitting an IP packet over the temporary DRB.

In accordance with another aspect of the present invention, a terminal for transmitting is provided. The terminal includes a transceiver for communicating signals with a base station a controller for determining to apply a low security transfer procedure, for transmitting a Random Access Preamble to a base station, for receiving a RAR message from the base station, and for transmitting an IP packet through MAC PDU including separated UP PDU to the base station.

In accordance with another aspect of the present invention, a base station for receiving data is provided. The base station includes a transceiver for communicating signals with a terminal, and a controller for receiving an RRC connection request message including a temporary DRB request to which AS security is not applied from a terminal, for transmitting an RRC connection setup message including a temporary DRB configuration to the terminal, and for receiving an IP packet transmitted by the UE over the temporary DRB.

In accordance with another aspect of the present invention, a base station for receiving data is provided. The base station includes a transceiver for communicating signals with a terminal, and a controller for receiving a Random Access Preamble from a terminal, for transmitting an RAR message to the terminal, and for receiving an IP packet through a MAC PDU including separated UP PDU.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
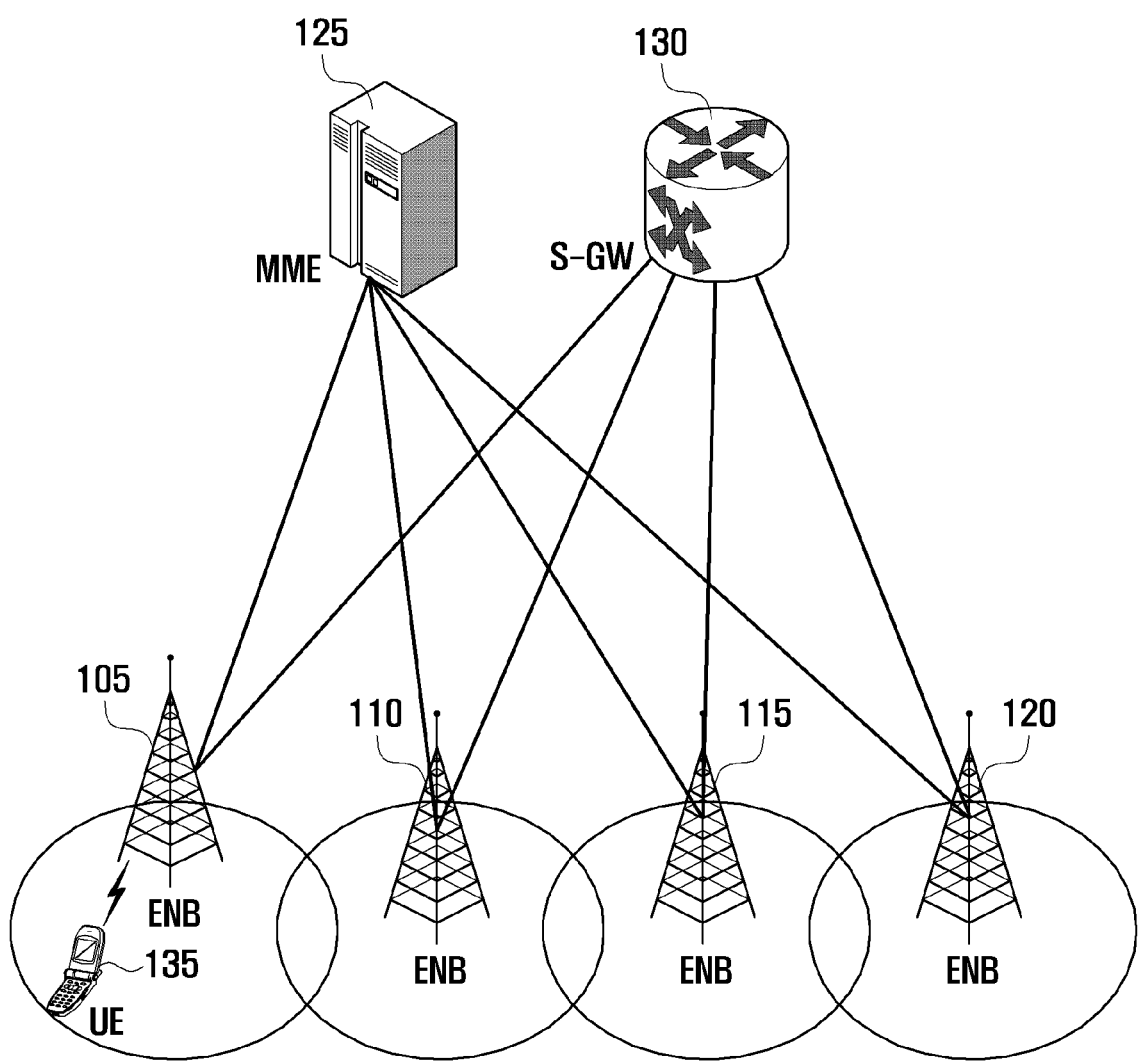
FIG. 1 is a diagram illustrating an architecture of a Long Term Evolution (LTE) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention relate to a method and an apparatus for efficiently transmitting data packets that occur sporadically and are small in size while reducing signaling overhead.

Prior to the description of exemplary embodiments of the present invention, brief description is made of a Long Term Evolution (LTE) system.

FIGS. 1 through 25, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a diagram illustrating an architecture of an LTE system according to an exemplary embodiment of the present invention.

Referring to FIG. 1, a radio access network of a mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130.

In FIG. 1, the eNBs 105, 110, 115, and 120 correspond to legacy node Bs of a Universal Mobile Telecommunications System (UMTS). The eNBs 105, 110, 115, and 120 allow the UE to establish a radio link and are responsible for complicated functions as compared to the legacy node B. In the LTE system, all the user traffic including real time services, such as Voice over Internet Protocol (VoIP), are provided through a shared channel and thus there is a need of a device which is located in the eNB to schedule data based on the state information, such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. In addition, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
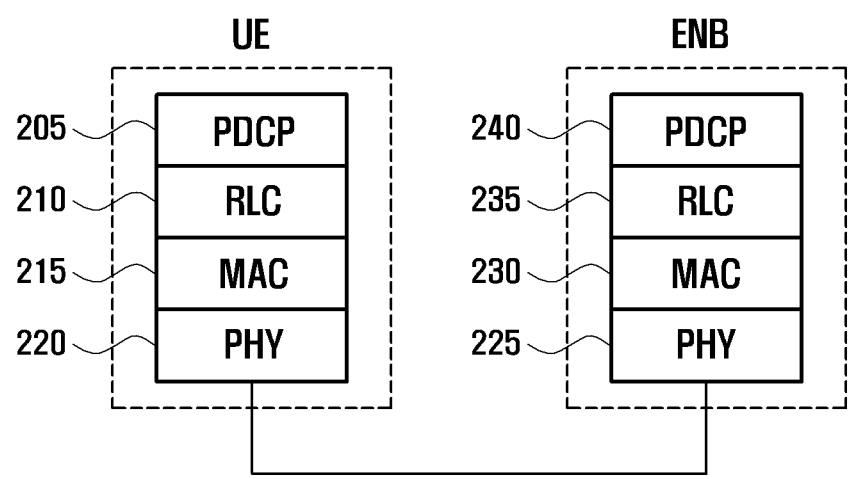
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system includes Packet Data Convergence Protocol (PDCP) layers 205 and 240, Radio Link Control (RLC) layers 210 and 235, Medium Access Control (MAC) layers 215 and 230, and Physical (PHY) layers 220 and 225. The PDCP layers 205 and 240 are responsible for IP header compression/decompression, and the RLC layers 210 and 235 are responsible for segmenting the PDCP Protocol Data Unit (PDU) into segments in appropriate size for Automatic Repeat Request (ARQ) operation. ARQ is the technique for determining whether the packet transmitted by the transmitted is received by the received successfully and for retransmitting the packets received erroneously. The MAC layers 215 and 230 are responsible for establishing connection to a plurality of RLC entities so as to multiplex the RLC PDUs into MAC PDUs and demultiplex the MAC PDUs into RLC PDUs. The PHY layers 220 and 225 perform channel coding on the MAC PDU and modulate the MAC PDU into OFDM symbols to transmit over radio channel or perform demodulating and channel-decoding on the received OFDM symbols and deliver the decoded data to the higher layer.

Figure 3:
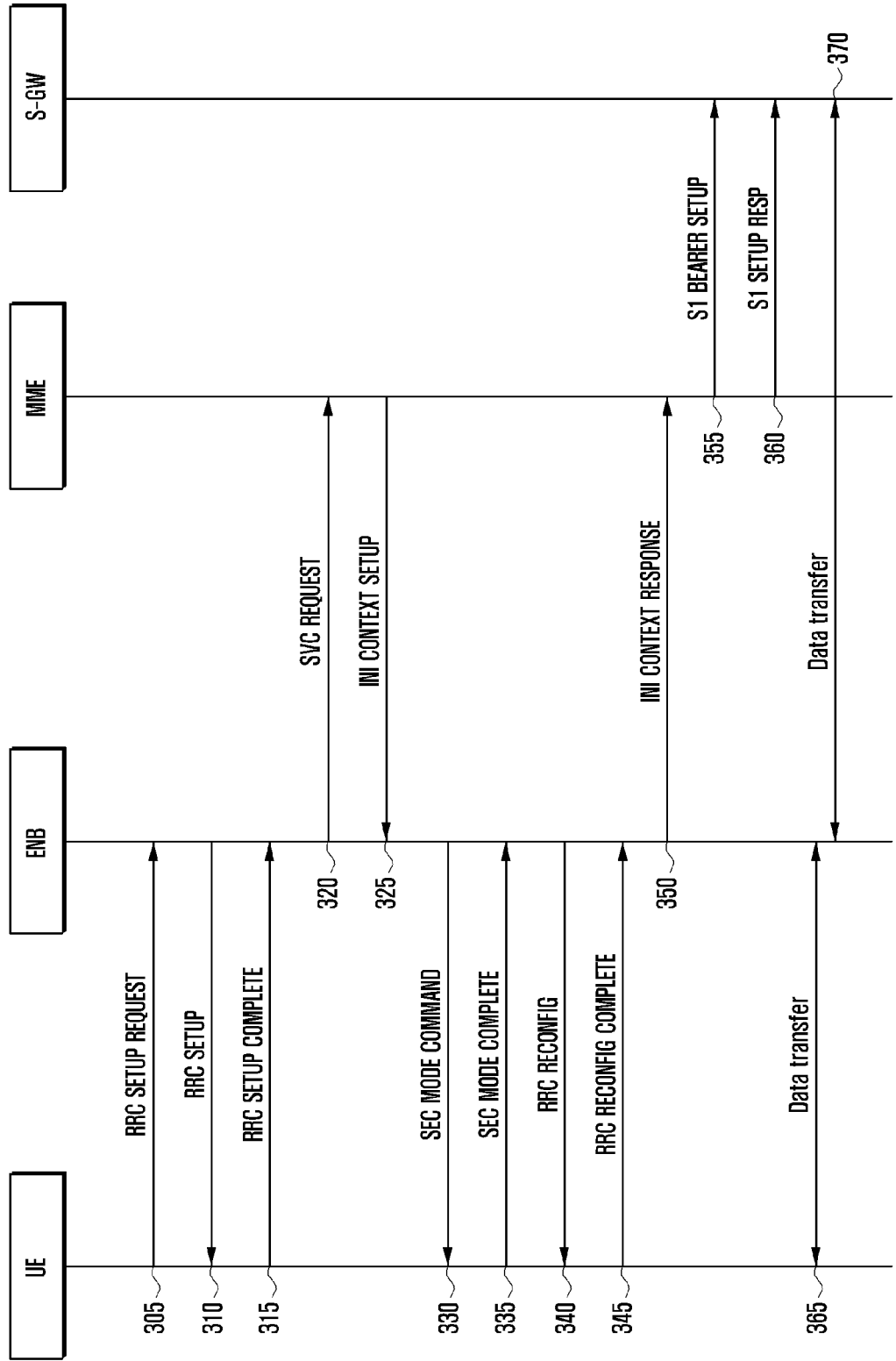
FIG. 3 is a signaling diagram illustrating a connection establishment procedure between a User Equipment (UE) and a network for data communication according to an exemplary embodiment of the present invention.

FIG. 3 is a signaling diagram illustrating a connection establishment procedure between a UE and a network for data communication according to an exemplary embodiment of the present invention.

Referring to FIG. 3, if data to be transmitted occurs, the UE in an idle mode (hereinafter, referred to as idle mode UE) performs a Radio Resource Control (RRC) CONNECTION ESTABLISHMENT procedure with the eNB. The UE acquires uplink transmission synchronization with the eNB through a random access procedure and sends the eNB an RRC CONNECTION REQUEST message at step 305. This message includes a UE identifier and the reason of the connection establishment. The eNB sends the UE an RRC CONNECTION SETUP message at step 310. This message includes the RRC connection configuration information. The RRC connection is referred to as Signaling Radio Bearer (SRB) for exchanging RRC messages as control message between the UE and the eNB. After the RRC connection setup, the UE sends the eNB an RRC CONNECTION SETUP COMPLETE message at step 315. This message includes a control message, i.e., a SERVICE REQUEST, requesting the MME for RRC bearer configuration for a pre-defined service. The eNB forwards the SERVICE REQUEST message included in the RRC CONNECTION SETUP COMPLETE message to the MME at step 320, and the MME determines whether to provide the service requested by the UE. If it is determined to provide the service requested by the UE, the MME sends the eNB an INITIAL CONTEXT SETUP REQUEST message at step 325. This message includes Quality of Service (QoS) information to be applied in Data Radio Bearer (DRB) configuration and security-related information (e.g., Security Key and Security Algorithm) to be applied to the DRB. The eNB sends the UE a SECURITY MODE COMMAND message at step 330 and receives a SECURITY MODE COMPLETE message from the UE at step 335 for configuring security with the UE. If the security configuration has completed, the eNB sends the UE an RRC CONNECTION RECONFIGURATION message at step 340. This message includes the configuration information of DRB on which the user data is to be processed, and the UE configures the DRB by applying the above information and sends the eNB an RRC CONNECTION RECONFIGURATION COMPLETE message at step 345. After completing the DRB configuration with the UE, the eNB sends the MME an INITIAL CONTEXT SETUP COMPLETE message at step 350, and the MME exchanges S1 BEARER SETUP message at step 355 and S1 BEARER SETUP RESPONSE message at step 360 with the S-GW for S1 bearer configuration. The S1 BEARER is the connection established between the S-GW and the eNB for data transmission and mapped to the DRB 1 by 1. Once the above procedures have completed, the UE communicates data with the eNB via the S-GW at steps 365 and 370.

The UE and the network maintain two types of security configurations. Assuming that the security between the UE and the MME is referred to as security 1 and the security between the UE and the eNB as security 2, the securities 1 and 2 are characterized as follows.

Security 1 is the security provided to the control message between the UE and the MME using a predefined security key and security algorithm and COUNT (hereinafter, the control message between the UE and the MME is referred to as a Non-Access Stratum (NAS) message). The security 1 is maintained even when the UE transitions to the idle mode after the initial attachment to the network. The security 1 is provided with integrity protection and ciphering. The integrity protection is applied to all NAS messages with the exception of the initial access message, and ciphering is applied after first DRB is configured. The UE transmits the SERVICE REQUEST message with the information indicating the security applied thereto, and the MME performs an integrity determination using the above information and sequence number of the SERVICE REQUEST message. If the integrity determination is verified, the ciphering is applied to the NAS messages afterward. The COUNT is a variable incrementing at every packet and derived from the NAS sequence number. Hereinafter, the COUNT of security 1 is referred to as COUNT1.

Security 2 is the security provided to the data exchange between the UE and the eNB using another security key and predefined security algorithm and COUNT. The security 2 is applied after the UE establishes the RRC connection and exchanges SECURITY MODE COMMAND/COMPLETE messages with the eNB and performed at the PDCP layer of the UE. The security key and algorithm information are determined in the SECURITY MODE configuration procedure. The COUNT is a variable incrementing monotonously at every packet and derived from the PDCP sequence number. In exemplary embodiments of the present invention, the COUNT of the security 2 is referred to as COUNT2.

The procedure of FIG. 3 can be divided into three processes: an RRC connection configuration, a security 2 configuration, and a DRB configuration. These processes cause no problem in a data transfer of the related art (normal data transfer) but may cause a relatively significant increase of signaling overhead when the connection for transmitting a few small size packets occurs sporadically.

In order to address this problem, an exemplary embodiment of the present invention defines a new data transfer procedure appropriate for a sporadic small size packet transmission.

Figure 4:
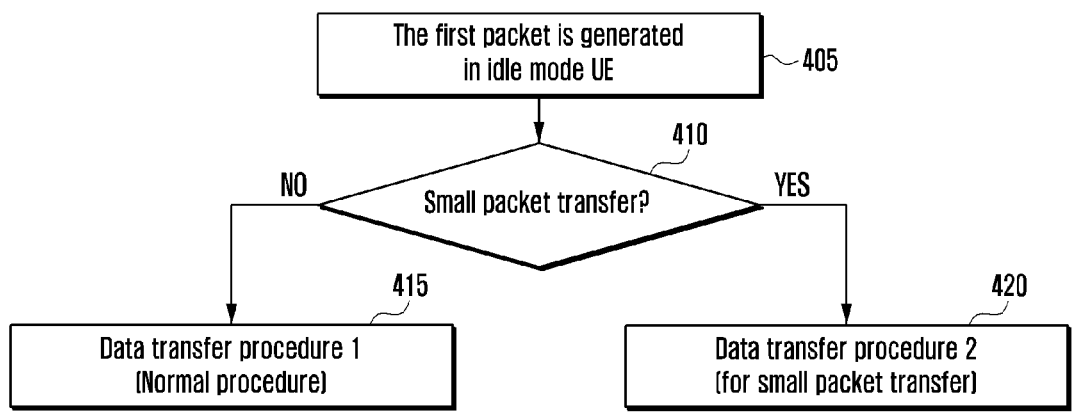
FIG. 4 is a flowchart illustrating a data transfer procedure for small size sporadic packet transmission according to an exemplary embodiment of the present invention.

FIG. 4 is a flowchart illustrating a data transfer procedure for small size sporadic packet transmission according to an exemplary embodiment of the present invention.

Referring to FIG. 4, if new data occurs in an idle mode UE (i.e., the UE with no RRC connection) at step 405, the UE determines whether the newly generated data fulfills the small packet data transfer condition at step 410. If the newly generated data does not fulfill the condition (i.e., if a data transmission procedure of the related art is preferable), the UE performs the data transfer procedure 1 at step 415. At this time, the data transfer procedure 1 is the method of the related art as shown in FIG. 3.

In contrast, if the small packet transfer procedure is preferable, the UE performs the data transfer procedure 2 at step 420.

The data transfer procedure 2 is the method proposed in exemplary embodiments of the present invention and described hereinafter with reference to accompanying drawings.

First Exemplary Embodiment

According to the first exemplary embodiment, it is possible to reduce signaling overhead with the security 2 configuration. Using the DRB to which AS security is not applied, it is possible to transmit the small size packets.

In order to accomplish this, a DRB that can be configured before the AS security activation (i.e., before step 330 of FIG. 3) is proposed, and this DRB is referred to as Temporary DRB or Temp DRB hereinafter. Since the temporary DRB is configured before the AS security activation, Robust Header Compression (ROHC) and AS security may not be performed at the PDCP layer.

In the first exemplary embodiment, the UE and eNB operations for configuring Temporary DRB and an exemplary method for applying NAS security at S-GW for Temp DRB security are proposed. In addition, in consideration of the case where the packet transmission is continued, it is suggested to switch from the proposed data transfer procedure to the data transfer procedure of the related art. This is because it is preferable to switch to the data transfer procedure 1 to transmit the packet continuously when the packet transmission continues.

Prior to the explanation of the first exemplary embodiment, a description is made of a Data Radio Bearer (DRB) to help understand exemplary embodiments of the present invention.

Figure 23:
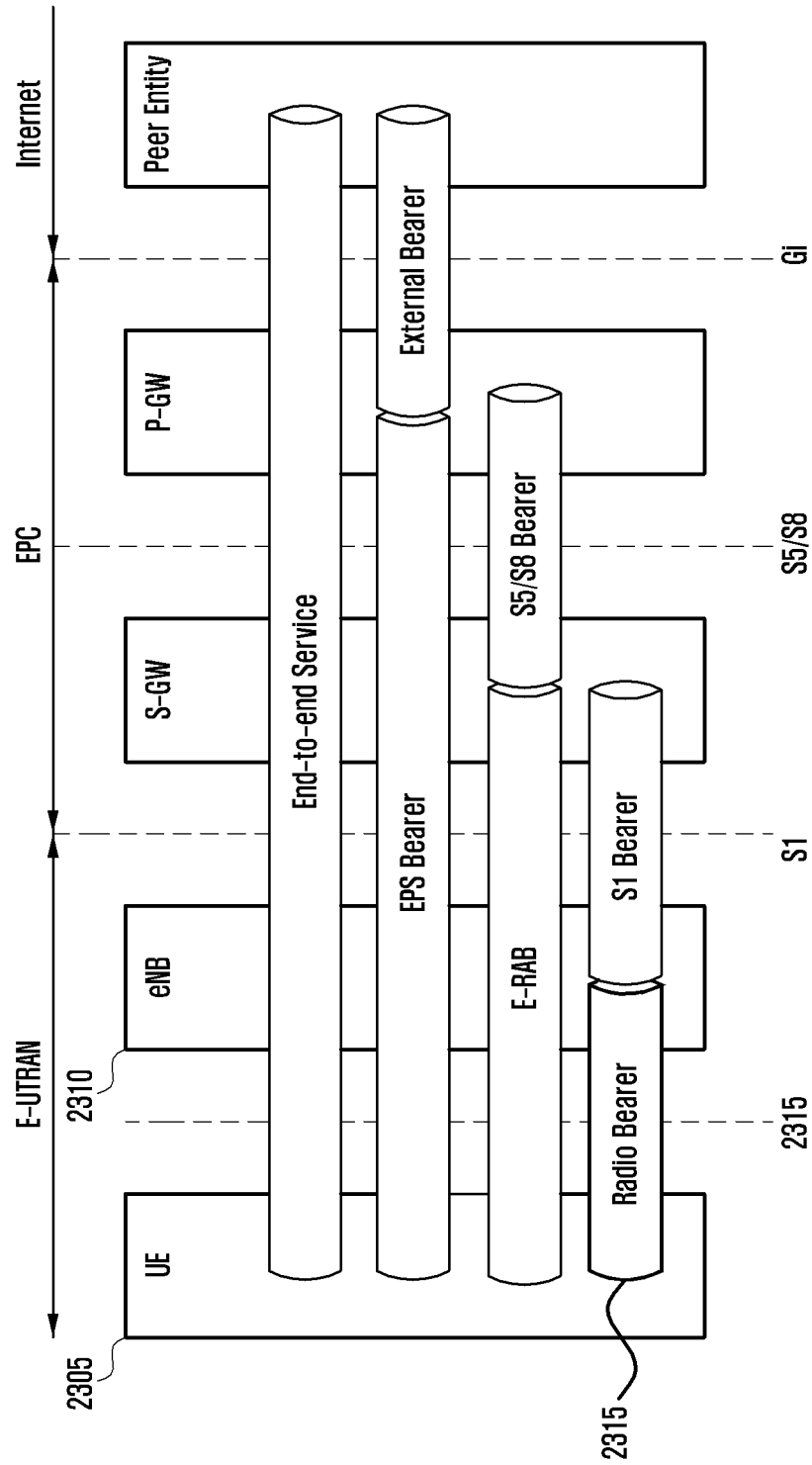
FIG. 23 is a diagram illustrating a configuration of an Evolved Packet System (EPS) Bearer Service Architecture according to an exemplary embodiment of the present invention.

FIG. 23 is a diagram illustrating a configuration of an Evolved Packet System (EPS) Bearer Service Architecture according to an exemplary embodiment of the present invention.

Referring to FIG. 23, a DRB 2315 is used for exchanging user data between the UE 2305 and the eNB 2310 in the E-UTRAN. Typically, the DRB configuration is performed using the RRC CONNECTION RECONFIGURATION message after the INITIAL SECURITY ACTIVATION procedure, and the security operations of the integrity protection and ciphering are applied. The integrity protection is used to determine whether the corresponding packet is contaminated. Meanwhile, the packet is ciphered to protect exposure to others.

Figure 24:
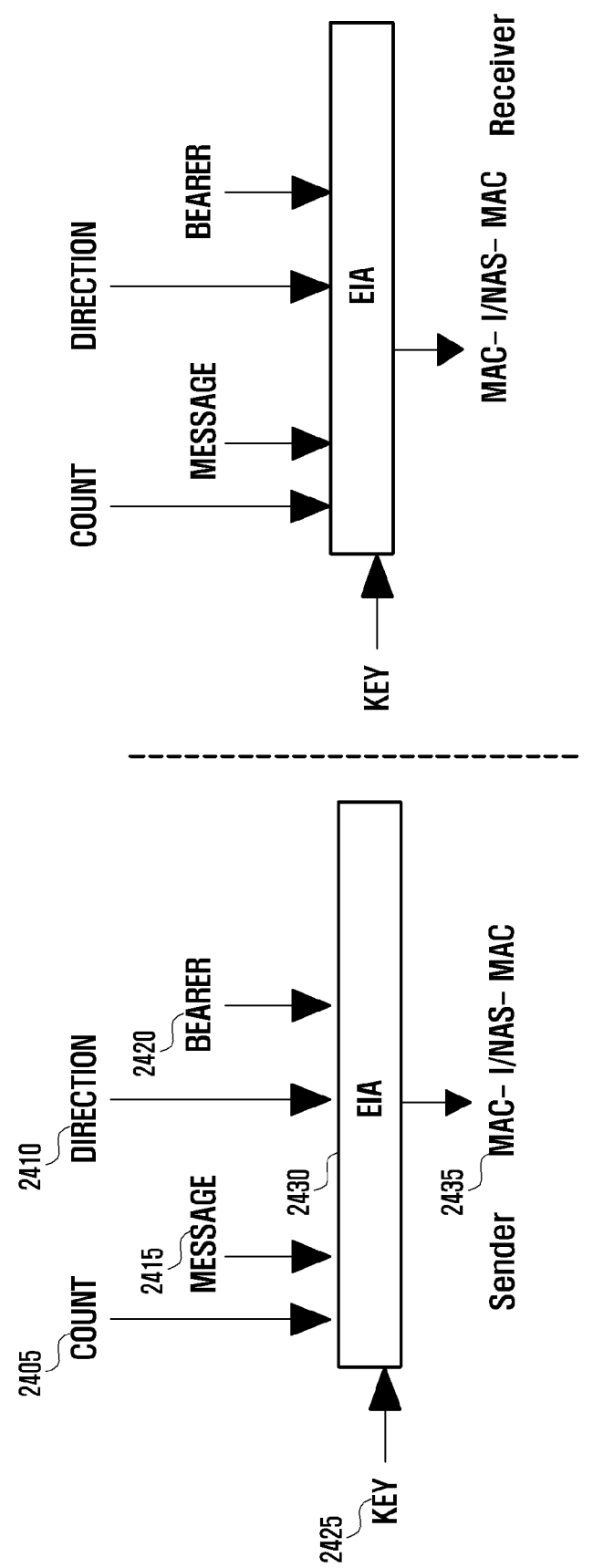
FIG. 24 is a diagram illustrating an integrity protection procedure according to an exemplary embodiment of the present invention.

FIG. 24 is a diagram illustrating an integrity protection procedure according to an exemplary embodiment of the present invention.

Referring to FIG. 24, a transmitter calculates MAC 2435 by inputting a message 2415 to which a predefined key 2425, predefined variables, and integrity protection are applied to a device equipped with a predefined security algorithm. The predefined variables include COUNT 2405, DIRECTION 2410, BEARER 2420, and the like. The COUNT 2405 is a variable derived from an NAS sequence number, the DIRECTION 2410 is a variable determined depending on uplink/downlink, and BEARER 2420 is a predefined value.

Figure 25:
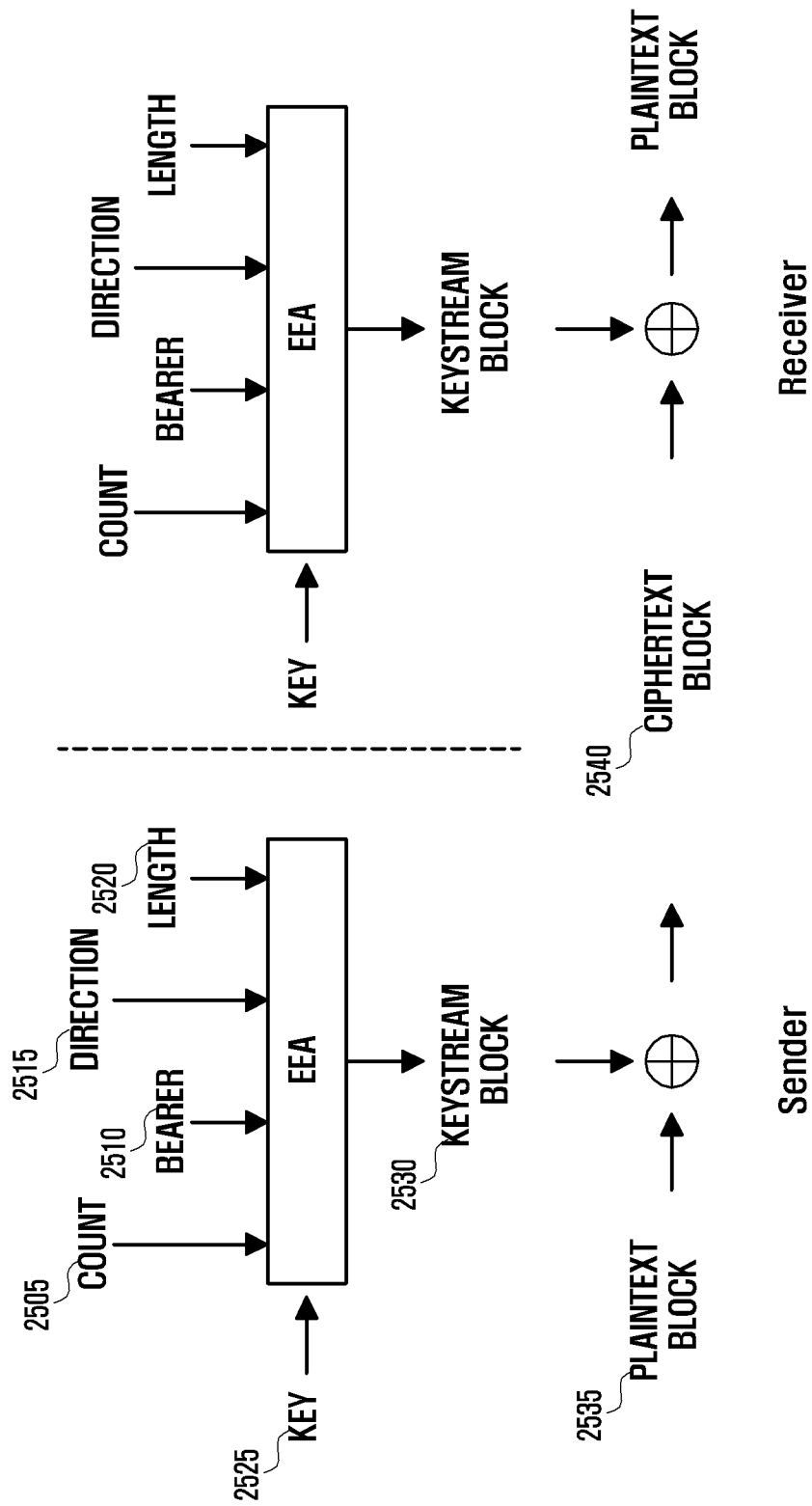
FIG. 25 is a diagram illustrating a ciphering procedure according to an exemplary embodiment of the present invention.

FIG. 25 is a diagram illustrating a ciphering procedure according to an exemplary embodiment of the present invention.

Referring to FIG. 25, the ciphering is performed by applying a predefined operation (e.g., an exclusive OR operation) to the KEYSTREAM BLOCK 2530 having the same length as the bit stream (PLAINTEXT 2535) applied to the ciphering. The KEYSTREAM BLOCK 2530 is generated by a predefined KEY 2525, an algorithm, and variables, and the variables include COUNT 2505, BEARER 2510, DIRECTION 2515, LENGTH 2520, and the like. The LENGTH 2520 is a variable indicating the length of the PLAINTEXT 2535/KEYSTREAM BLOCK 2530. The deciphering is completed by applying a predefined operation to the KEYSTREAM BLOCK 2530 and CIPHERTEXT BLOCK 2540 generated by the same key, algorithm, and variables applied to the ciphering.

Figure 5:
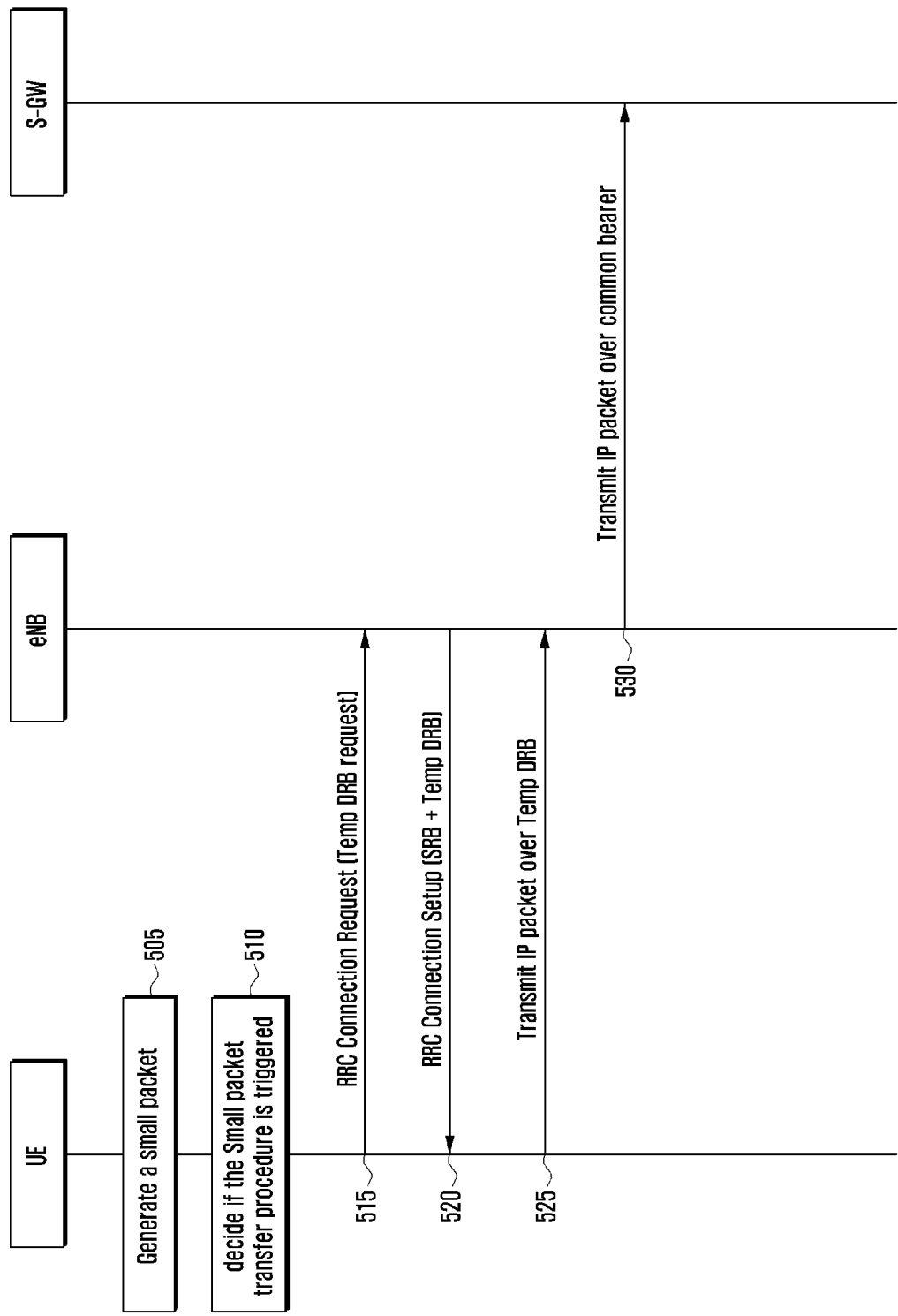
FIG. 5 is a signaling diagram illustrating a small size packet transmission method according to a first exemplary embodiment of the present invention.

FIG. 5 is a signaling diagram illustrating a small size packet transmission method according to a first exemplary embodiment of the present invention.

Referring to FIG. 5, if small size packets occur at step 505, the UE decides whether to transmit the small size packet using the procedure of the first exemplary embodiment of the present invention at step 510. The predefined rules applied at step 510 are as follows.

First decision rule: IP packet occurs when there is no RRC connection, and the size of the IP packet is smaller than a threshold, Second decision rule: IP packet occurs when there is no RRC connection for it, and IP address/port/Term of Service (ToS) matches with a predefined one, Third decision rule: IP packet occurs when there is no RRC connection for it, and IP address is coming from the predefined application.

It can be assumed that the application and IP address/port/ToS are preset by the service provider. It is possible to configure one of the three decision rules or configure all of the three rules and, if at least one fulfills the condition, uses the data transfer procedure of exemplary embodiments of the present invention. Other rules that are not enumerated above can be applied in exemplary embodiments of the present invention.

The UE requests the eNB for the Temp DRB using the RRC Connection Request message at step 515. The eNB configures the SRB and Temp DRB through the RRC connection Setup message at step 520. The UE transmits the IP packet of the format defined in exemplary embodiments of the present invention to the eNB for delivering the small size packet at step 525. The processed IP packet includes the NAS routing information (i.e., NAS UP rout.), NAS security information, and IP packet. The IP packet is described hereinafter with reference FIGS. 6 and 7.

The eNB completes IP packet reception and determines the S-GW id included in the IP packet at step 530. The eNB transmits the IP packet to the S-GW indicated by the S-GW id using the common bearer.

If the IP packet is received through the common bearer, the S-GW determines whether the IP packet includes the security context of a Specific-Temporary Mobile Subscriber Identifier (S-TMSI). The S-TMSI is the identifier for indicating a specific UE within one MME pool (i.e., including one or more MMES). If no security context is included, the S-GW requests the MME for the context. If the Security context is acquired, the S-GW deciphers the IP packet.

Figure 6:
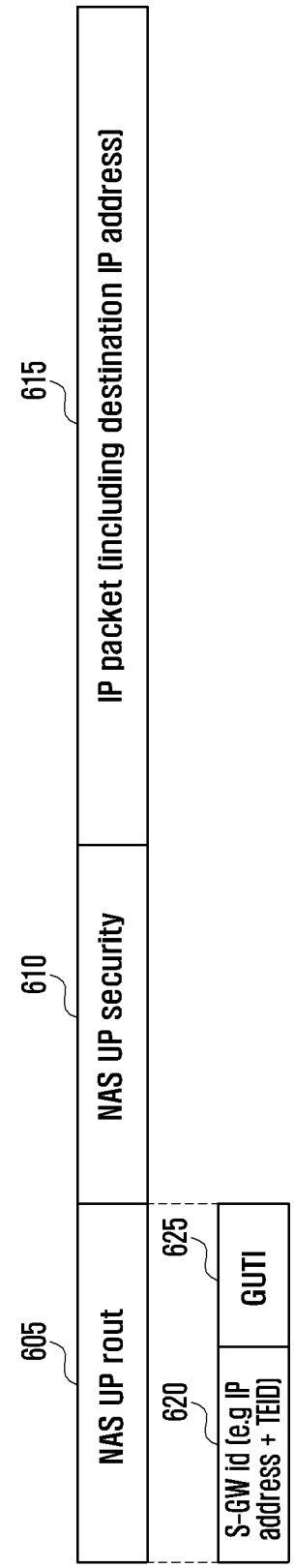
FIG. 6 is a diagram illustrating an Internet Protocol (IP) packet format according to the first exemplary embodiment of the present invention.

FIG. 6 is a diagram illustrating an Internet Protocol (IP) packet format according to the first exemplary embodiment of the present invention.

Referring to FIG. 6, the processed IP packet includes NAS routing information 605, NAS security information 610, and IP packet 615. The routing information includes an S-GW id 620 and a Globally Unique Temporary ID (GUTI) 625. The S-GW id is the information indicating the S-GW to which the eNB forwards the IP packet.

Figure 7:
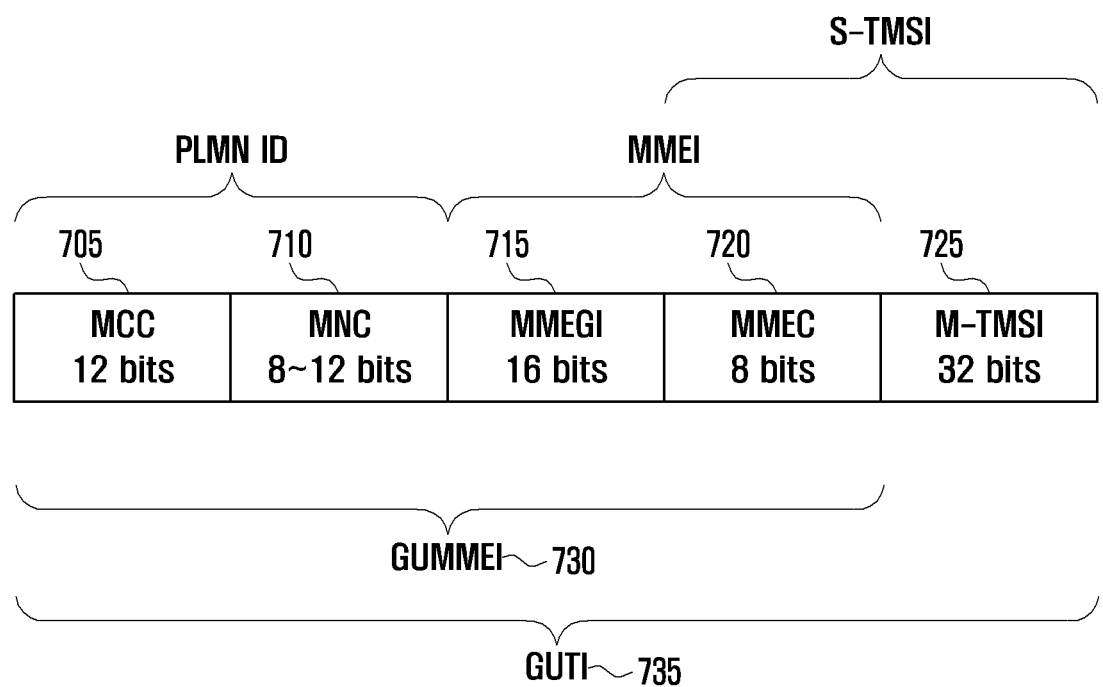
FIG. 7 is a diagram illustrating a format of a Globally Unique Temporary ID (GUTI) according to an exemplary embodiment of the present invention.

FIG. 7 is a diagram illustrating a format of a GUTI according to an exemplary embodiment of the present invention.

Referring to FIG. 7, GUTI 735 includes an MME id (GUMMEI) 730 and a UE id (M-TMSI) 725. The GUMMEI 730 is a unique MME id, and the M-TMSI 725 is the UE id for use in a specific MME. The GUTI 735 is used to acquire UE context for NAS security from the MME. In order to receive the GUTI 735, it is required to notify the S-GW of the related MME id (GUMMEI) 730 and UE id (M-TMSI) 725. The GUTI 735 includes the following information.

MCC (Mobile Country Code) 705: 12-bit country code allocated by ITU.

MNC (Mobile Network Code) 710: 8~12-bit network code allocated by a national authority of each country.

MMEGI (MME Group Identifier) 715: 16-bit identifier indicating the MME group in a PLMN.

MMEC (MME Identifier) 720: 8-bit identifier for indicating MME in a PLMN.

M-TMSI (MME Mobile Subscriber Identifier) 725: 32-bit identifier for indicating a UE in an MME.

The NAS security information includes KSI, MAC-I, NAS SN, and the like. The IP packet 615 transmitted by the UE can be ciphered with the NAS security 610.

Figure 8:
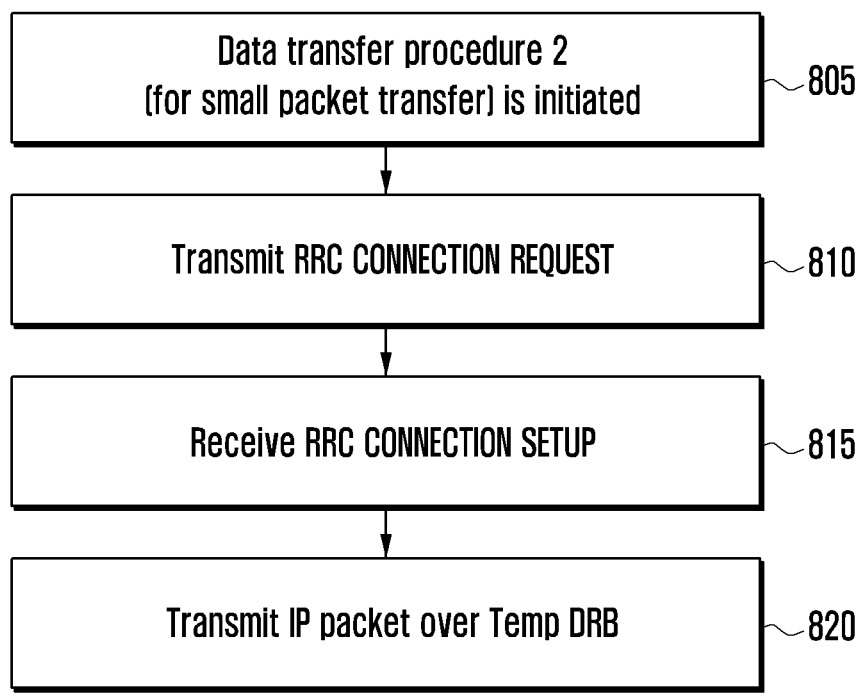
FIG. 8 is a flowchart illustrating a UE operation according to the first exemplary embodiment of the present invention.

FIG. 8 is a flowchart illustrating a UE operation according to the first exemplary embodiment of the present invention.

Referring to FIG. 8, the UE initializes the data transfer method proposed in exemplary embodiments of the present invention to transmit a small size packet at step 805. The UE sends the eNB an RRC CONNECTION REQUEST message at step 810. This RRC message is used to request for temporary DRB configuration. The UE receives an RRC CONNECTION SETUP message transmitted by the eNB at step 815. This RRC message includes the SRB and temporary DRB configuration information. The UE transmits the IP packet over the configured temporary DRB at step 820.

Figure 9:
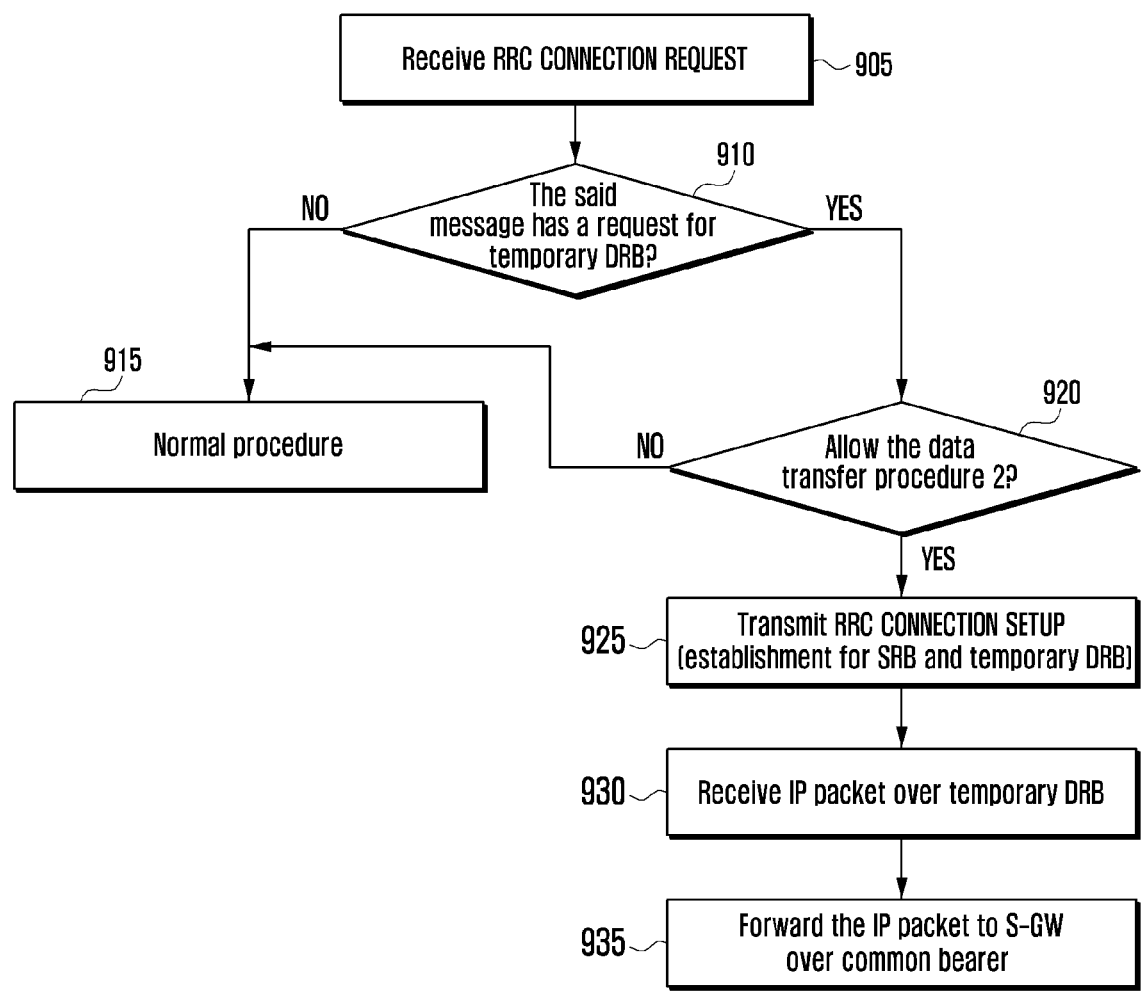
FIG. 9 is a flowchart illustrating an evolved Node B (eNB) operation according to the first exemplary embodiment of the present invention.

FIG. 9 is a flowchart illustrating an evolved Node B (eNB) operation according to the first exemplary embodiment of the present invention.

Referring to FIG. 9, the eNB receives the RRC CONNECTION REQUEST message transmitted by the UE at step 905. The eNB determines whether the RRC message includes the request for temporary DRB at step 910. If there is no request for the temporary DRB, the eNB performs a procedure of the related art as depicted in FIG. 3 at step 915.

In contrast, if there is the request for the temporary DRB, the eNB determines whether to allow the data transfer procedure for transmitting a small size packet according to the first exemplary embodiment at step 920.

If it is determined at step 920 to allow the data transfer procedure according to the first exemplary embodiment, the eNB sends the UE an RRC CONNECTION SETUP message to configure SRB and temporary DRB at step 925. The eNB receives the IP packet from the UE over the temporary DRB at step 930. The eNB forwards the received packet to the S-GW at step 935.

Figure 10:
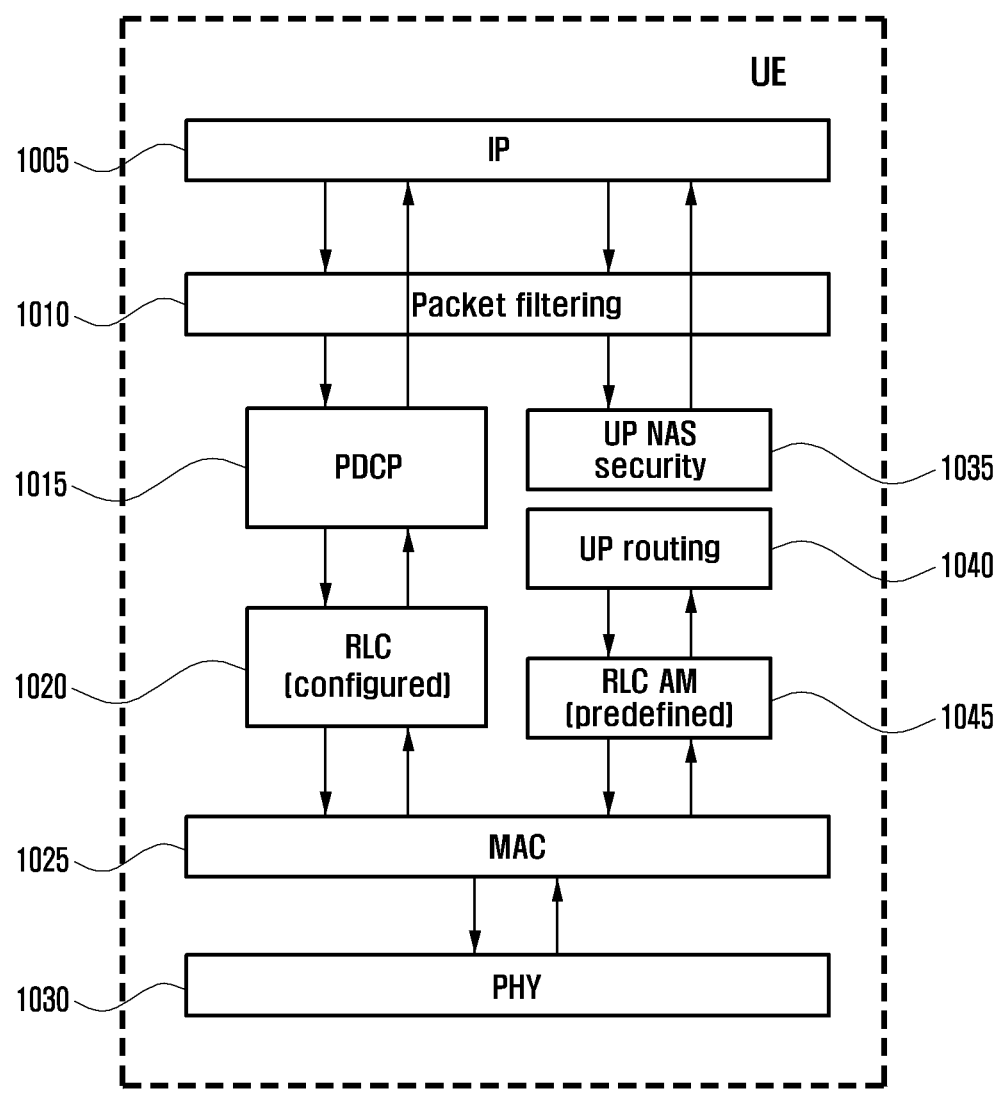
FIG. 10 is a block diagram illustrating a protocol architecture of a UE according to the first exemplary embodiment of the present invention.

FIG. 10 is a block diagram illustrating a protocol architecture of a UE according to the first exemplary embodiment of the present invention.

Referring to FIG. 10, the IP packet to be transmitted is generated at the IP layer 1005 of the UE. In the UE's protocol structure, the packet filtering 1010 determines whether to allow for the packet transfer procedure of the present invention. If it is allowed to perform the packet transfer procedure of the present invention, the legacy PDCP layer 1015 and RLC layer 1020 are deactivated, and predefined NAS security 1035, UP routing 1040, and RLC AM entity 1045 are activated. The MAC layer 1025 generates a MAC PDU in a predefined format. The PHY layer 1030 transmits the IP packet to the eNB.

Figure 11:
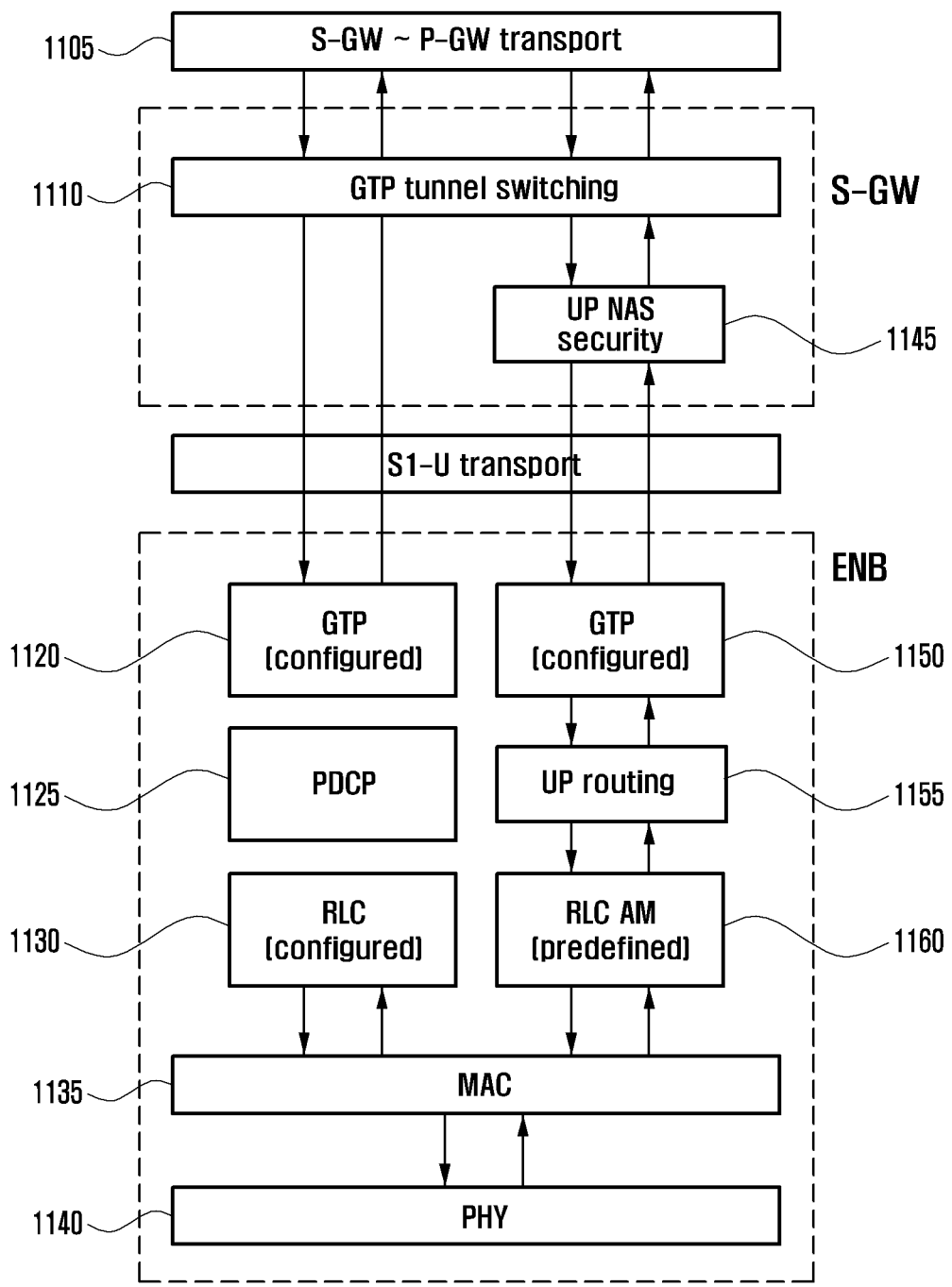
FIG. 11 is a block diagram illustrating a protocol architecture of an eNB and a Serving-Gateway (S-GW) according to the first exemplary embodiment of the present invention.

FIG. 11 is a block diagram illustrating a protocol architecture of an eNB and an S-GW according to the first exemplary embodiment of the present invention.

Referring to FIG. 11, a packet received by a PHY layer 1140 is delivered to a MAC layer 1135 as the upper layer. The MAC layer 1135 determines whether to apply the method of the related art or the proposed exemplary method of the present invention. If the format of the received packet matches the method of the related art, the packet is processed by means of the RLC layer 1130, PDCP layer 1125, and General Packet Radio Service (GPRS) Tunnel Protocol (GTP) 1120 according to the packet processing procedure of the related art. In contrast, if the format of the received packet matches the exemplary method of the present invention, the packet is processed by means of the RLC AM 1160, UP routing 1155, and common GTP 1150. At this time, the eNB decodes the routing information and forwards the IP packet to the identified S-GW through common GTP tunnel 1110. The S-GW decodes the packet using the NAS security 1145 and forwards the decoded packet to the P-GW 1105.

Figure 12:
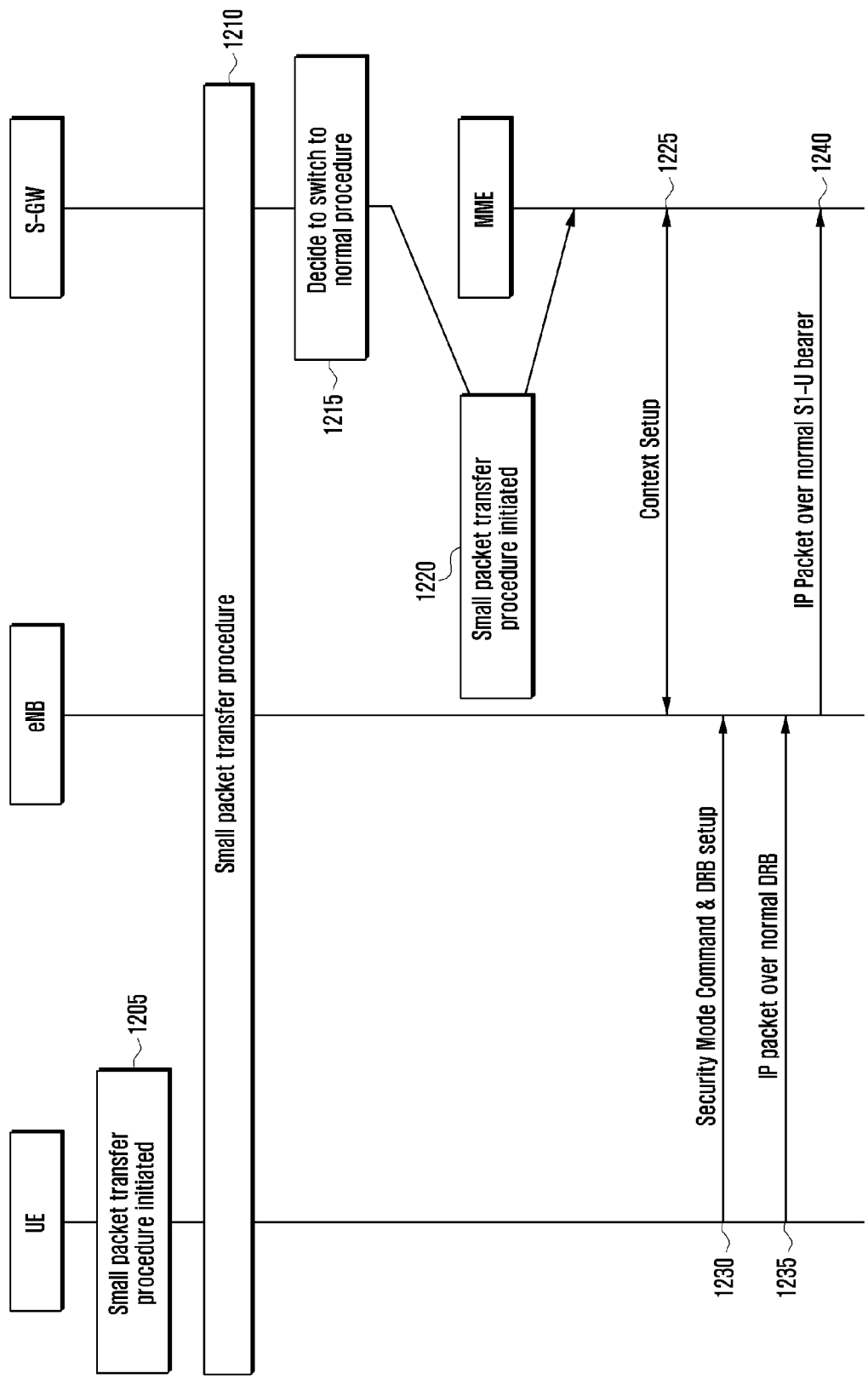
FIG. 12 is a signaling diagram illustrating a switching from a packet transfer procedure of the present invention to a packet transfer procedure of the related art according to the first exemplary embodiment of the present invention.

FIG. 12 is a signaling diagram illustrating a switching from a packet transfer procedure of the present invention to a packet transfer procedure of the related art according to the first exemplary embodiment of the present invention.

Referring to FIG. 12, a small size packet transfer procedure is triggered according to the above described determination rule at step 1205. The small packet transfer procedure is performed at step 1210. If the number of packets per unit time becomes equal to or greater than a threshold, the S-GW determines to switch to the packet transfer procedure of the related art at step 1215.

In this case, each entity performs an RRC connection establishment procedure at step 1220, and the UE sends the eNB an RRC Connection Request message. The eNB and the MME perform the context setup at step 1225. The UE and the eNB each applies the AS security through Security Mode Command procedure and configures a DRB through an RRC Connection Reconfiguration message at step 1230. If the DRB is set up successfully or if the RRC CONNECTION RECONFIGURATION procedure has completed, the UE terminates application of the enhanced procedure. The UE transmits the IP packet over the DRB of the related art at step 1235. The eNB forwards the IP packet over the S1-U bearer of the related art at step 1240.

Figure 13:
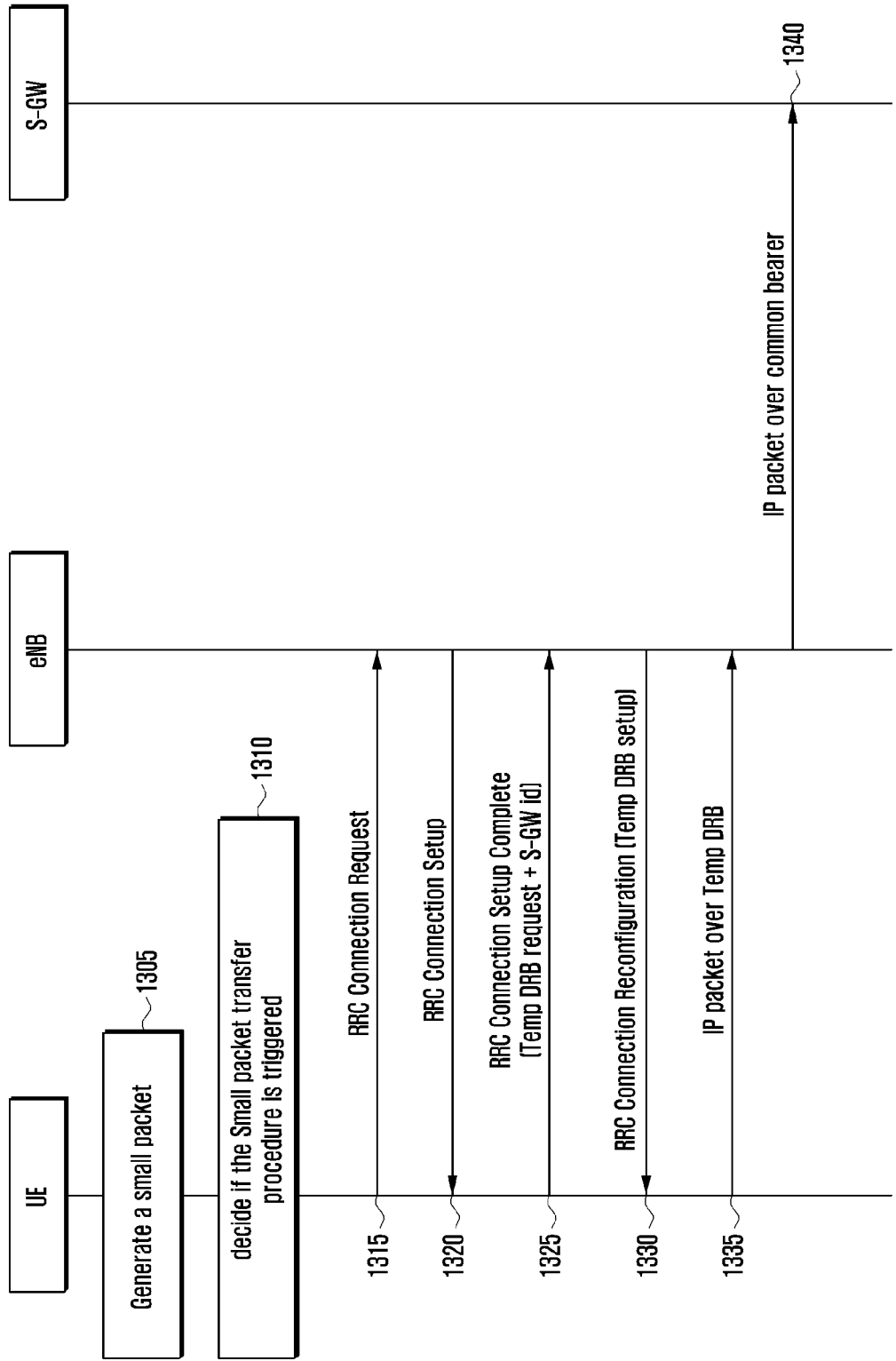
FIG. 13 is a signaling diagram illustrating a procedure for inserting temp Data Radio Bearer (DRB) request information and S-GW id information in a Radio Resource Control (RRC) Connection Setup Complete message according to an alternative of the first exemplary embodiment of the present invention.
Figure 14:
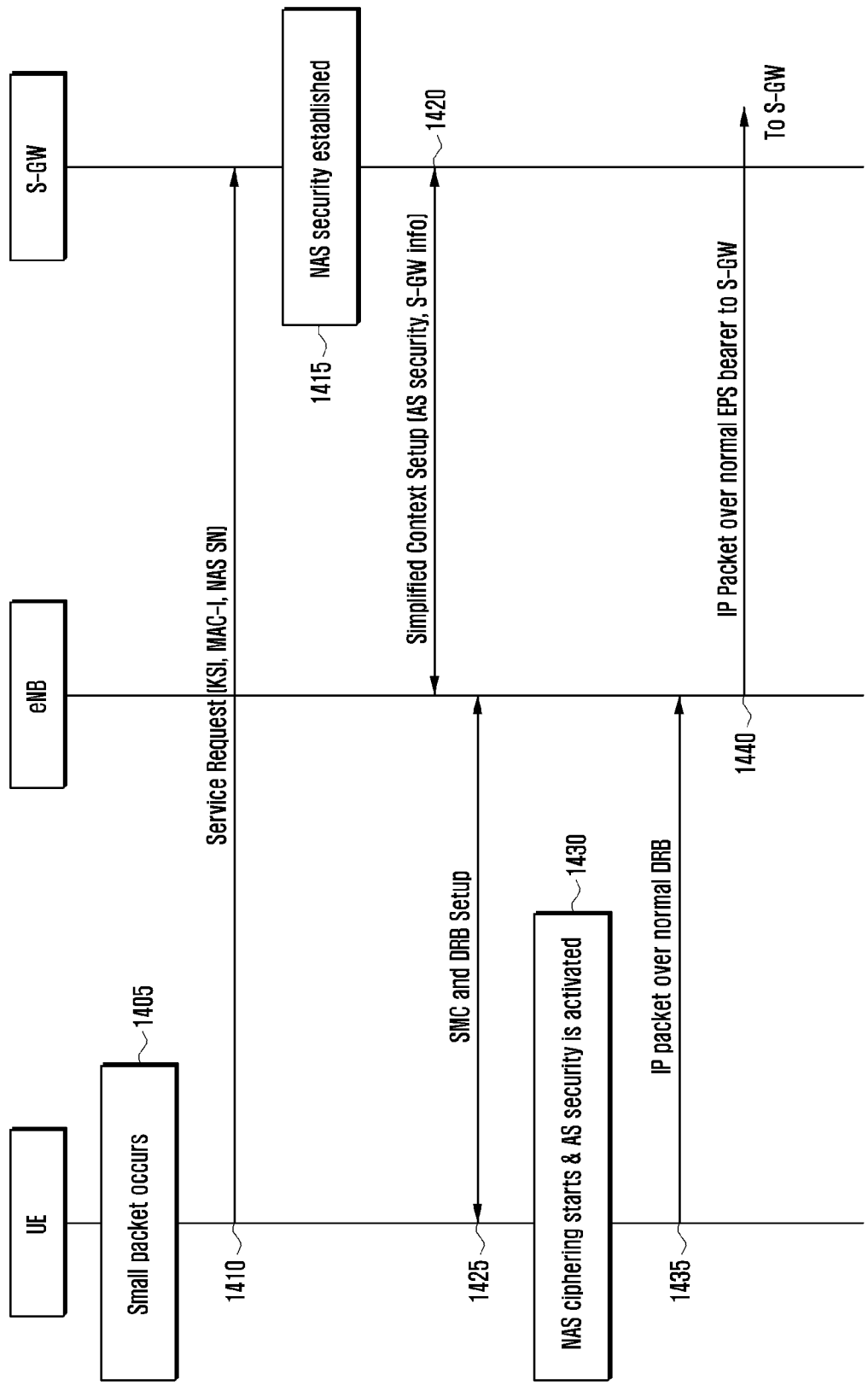
FIG. 14 is a signaling diagram illustrating a context setup procedure with minimum information without modification of a UE operation according to another alternative of the first exemplary embodiment of the present invention.

The first exemplary embodiment may have various alternatives. FIGS. 13 and 14 show such alternative exemplary methods.

FIG. 13 is a signaling diagram illustrating a procedure for inserting a temp DRB request information and S-GW id information in an RRC Connection Setup Complete message according to an alternative of the first exemplary embodiment of the present invention.

Referring to FIG. 13, a UE generates a small size packet at step 1305. The UE determines whether to allow for the small size packet transfer procedure according to a predefined rule at step 1310. The UE sends the eNB an RRC CONNECTION REQUEST message at step 1315. Unlike the exemplary embodiment of FIG. 5, the RRC CONNECTION REQUEST message at step 1315 includes no temporary DRB request information. This is because the Temp DRB request information is burdensome to the RRC Connection Request message which is very limited in size. Accordingly, the temp DRB request information is included in the RRC Connection Setup Complete message other than the RRC CONNECTION REQUEST message. The eNB sends the UE an RRC CONNECTION SETUP message at step 1320. The UE sends the eNB an RRC CONNECTION SETUP COMPLETE message including the temp DRB request information at step 1325. At this time, the eNB is capable of acquiring the S-GW id information in the NAS procedure between the UE and the MME. For example, the S-GW id can be provided in the TAU update procedure. This is to avoid overhead caused by including the S-GW in every IP packet. The eNB sends the UE an RRC CONNECTION RECONFIGURATION message to configure the temp DRB at step 1330. The UE transmits the packet over the temp DRB at step 1335. The eNB forwards the packet to the S-GW over the common bearer at step 1340.

FIG. 14 is a signaling diagram illustrating a context setup procedure with minimum information without modification of a UE operation according to another alternative of the first exemplary embodiment of the present invention.

Referring to FIG. 14, a UE generates small size packets at step 1405. The UE sends the MME a Service Request message including information related to security at step 1410. The MME configures NAS security at step 1415. The eNB and MME each performs AS security setup to provide context including routing information so as to negate the UE inserting routing information in the IP packet at step 1420. The UE and eNB apply the AS security through the Security Mode Command procedure and configure the DRB through an RRC Connection Reconfiguration message at step 1425. At step 1430, the UE commences NAS ciphering and activates the AS security. The eNB transmits the IP packet to the eNB over the normal DRB at step 1435. The eNB forwards the packet to the S-GW over the normal EPS bearer at step 1440. Although there is no reduction in the amount of signaling due to the use of the procedure of the related art, the MME transmits the small context as far as possible, resulting in reduction of signaling overhead.

Second Exemplary Embodiment

The second exemplary embodiment is characterized in that the Random Access CHannel (RACH) procedure of the related art is modified for facilitating small size packet transfer. By utilizing the RACH procedure, it is possible to address the problem of no AS security application by applying NAS security.

In the second exemplary embodiment, after receipt of a Random Access Response (RAR), a message format including the router header, NAS security information, and IP packet transmitted from the UE to the eNB is proposed. The new protocol stack configuration and per-layer functions for supporting exemplary embodiments of the present invention are substantially identical with those of the first exemplary embodiment as described with reference to FIGS. 10 and 11. In addition, an exemplary method for switching, when the packet transmission continues, from the proposed transfer procedure to the transfer procedure of the related art is proposed.

Prior to the explanation on the present exemplary embodiment, a description is made of the RACH procedure of the related art to help understand exemplary embodiments of the present invention.

Figure 15:
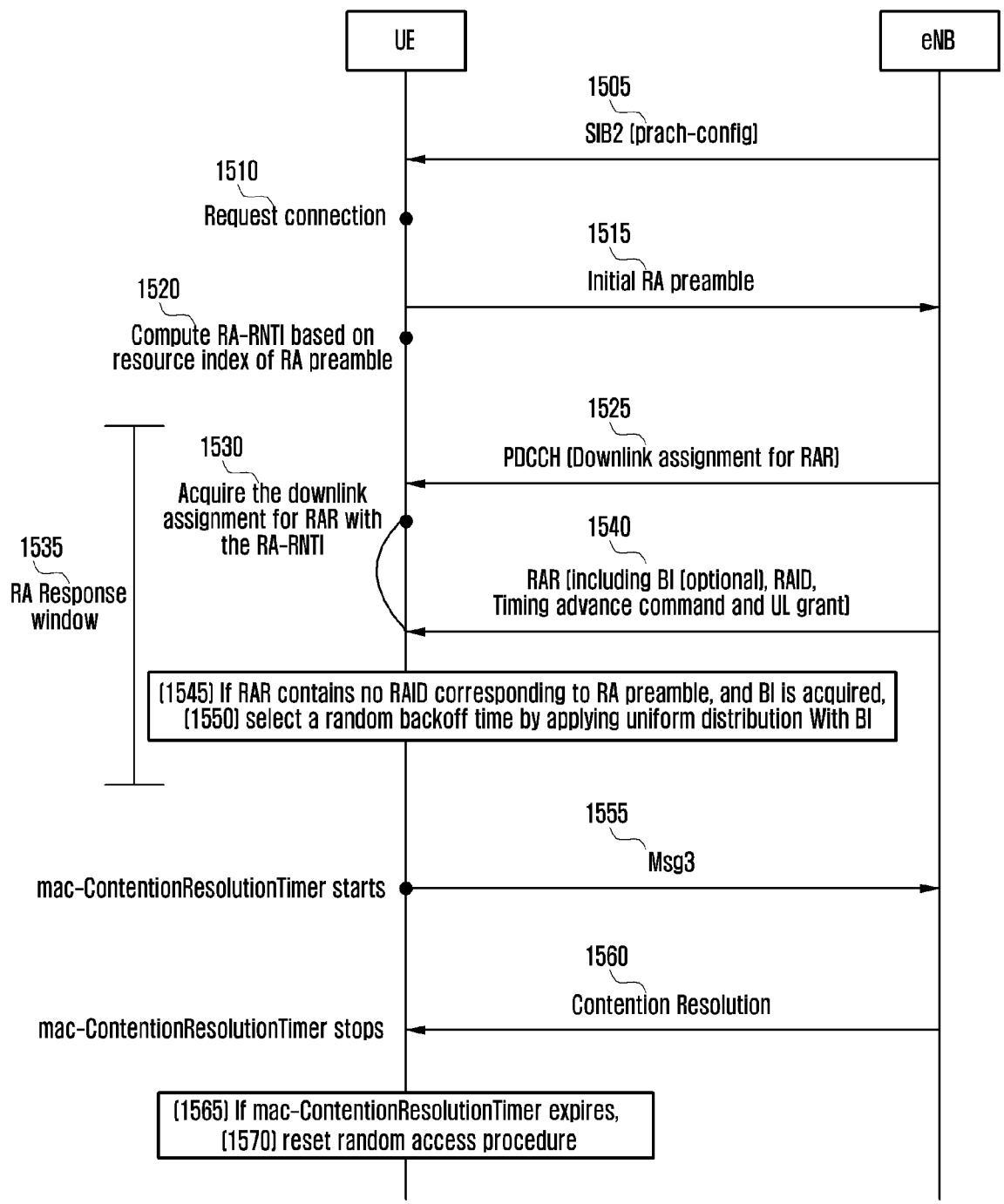
FIG. 15 is a signaling diagram illustrating a Random Access CHannel (RACH) procedure according to the related art.

FIG. 15 is a signaling diagram illustrating an RACH procedure according to the related art.

Referring to FIG. 15, a UE receives the random access-related information (i.e., Physical Random Access Channel-configuration (PRACh-config)) from the eNB in the System Information Block 2 (SIB 2) at step 1505. Here, this information includes preamble selection criteria, RA response window size, preamble transmission power information, and the like. If it is determined to establish a connection at step 1510, the UE sends the eNB an initial Random Access (RA) preamble at step 1515. Thereafter, the UE calculates the Random Access—Radio Network Temporary Identifier (RA-RNTI) value at step 1520 based on the information about the time and frequency used for the initial RA preamble transmission. The RA-RNTI value is used to retrieve the scheduling information of the RAR transmitted to the UE through a Physical Downlink Control Channel (PDCCH). The UE decodes the PDCCH using the calculated RA-RNTI at step 1525. The UE acquires scheduling information of RAR from the decoded PDCCH at step 1530. The UE receives the RAR using the acquired RAR scheduling information at step 1540. The RAR includes the Backoff Indicator (BI) information. The RAR reception is attempted only for a predefined duration, which is referred to as an RA response window 1535. If the RAR is not received before the expiry of the RA response window, the UE determines this as random access failure. Although the RAR has been received, if the RAR includes no Random Access Preamble Identifier (RAPID) of the preamble transmitted by the UE, the UE determines that the random access has failed at step 1545. The UE stores the received BI information. If it is determined that the random access has failed, the UE selects a value between 0 and the value indicated by the BI information randomly to perform backoff at step 1550. After the backoff time elapses, the UE retries the random access. If the RAR includes the RAPID of the preamble transmitted by the UE, the UE sends the eNB a msg3 at step 1555. The msg3 is transmitted after 6 frames since the receipt of the RAR message. According to the purpose of the RACH, the msg3 includes a related RRC message. For example, if the RACH has been established for initial access, the msg3 includes the RRC CONNECTION REQUEST message. If the RACH has been established for the RRC CONNECTION REESTABLISHMENT procedure, the msg3 includes the RRC CONNECTION REESTABLISHMENT REQUEST message. The msg3 transmitted after handover is used to transmit the RRC CONNECTION RECONFIGURATION message to the target cell. After transmitting the msg3, the UE starts a mac-ContentionResolutionTimer. The eNB sends the UE a Contention Resolution message at step 1560. This message is used to indicate that the UE has succeeded in the access contention. According to the RRC message included in the msg3, the corresponding RRC response message is transmitted. If the Contention Resolution message is received, the UE terminates the mac-ContentionResolutionTimer. If the Contention Resolution message is not received before the expiry of this timer at step 1565, the UE reinitiates the RACH procedure at step 1570.

Figure 16:
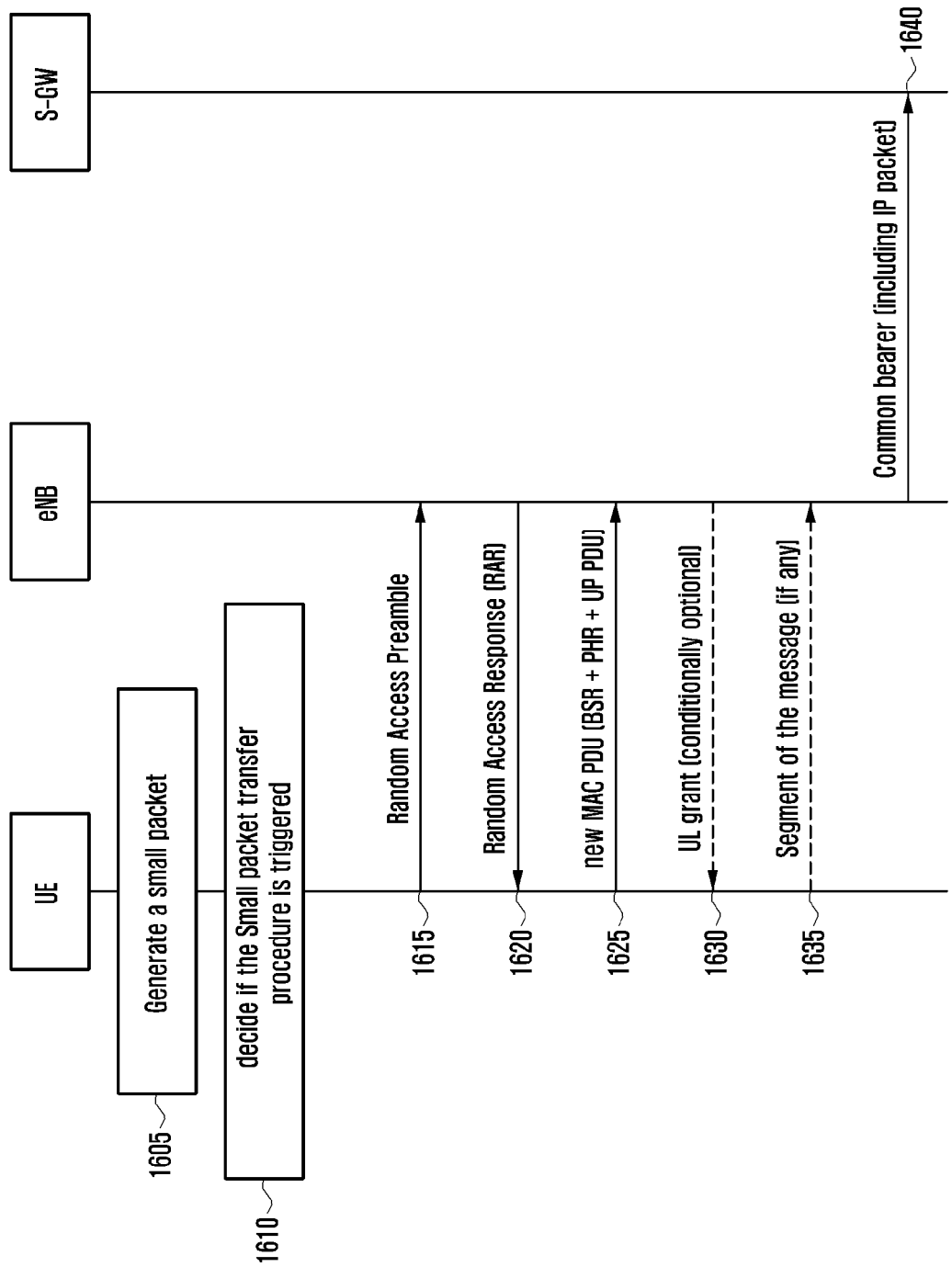
FIG. 16 is a signaling diagram illustrating a small size packet transfer procedure according to a second exemplary embodiment of the present invention.

FIG. 16 is a signaling diagram illustrating a small size packet transfer procedure according to a second exemplary embodiment of the present invention.

Referring to FIG. 16, a UE generates a small size packet at step 1605. The UE determines whether to allow for the small size packet transfer procedure according to a predefined rule at step 1610. The available rules have been described with reference to FIG. 5.

The UE sends the eNB a Random Access Preamble at step 1615. The eNB sends the UE an RAR at step 1620. The UE sends the eNB a MAC PDU in the format defined in the present exemplary embodiment other than the msg3 of the related art at step 1625. The corresponding MAC PDU is described hereinafter with reference to FIG. 17.

If it is impossible to transmit the UP PDU at a time, the UP PDU is segmented for transmission at step 1630, for which the eNB sends the UE a UL grant. Whether to transmit the UL grant is determined based on the Buffer Status Report (BSR) received from the UE at step 1635. The UE sends the eNB the remaining segments of the UP PDU. After completing the receipt of the UP PDU at step 1640, the eNB determines the S-GW id included in the UP PDU. The S-GW id indicates the S-GW to which the corresponding IP packet is transmitted.

Figure 17:
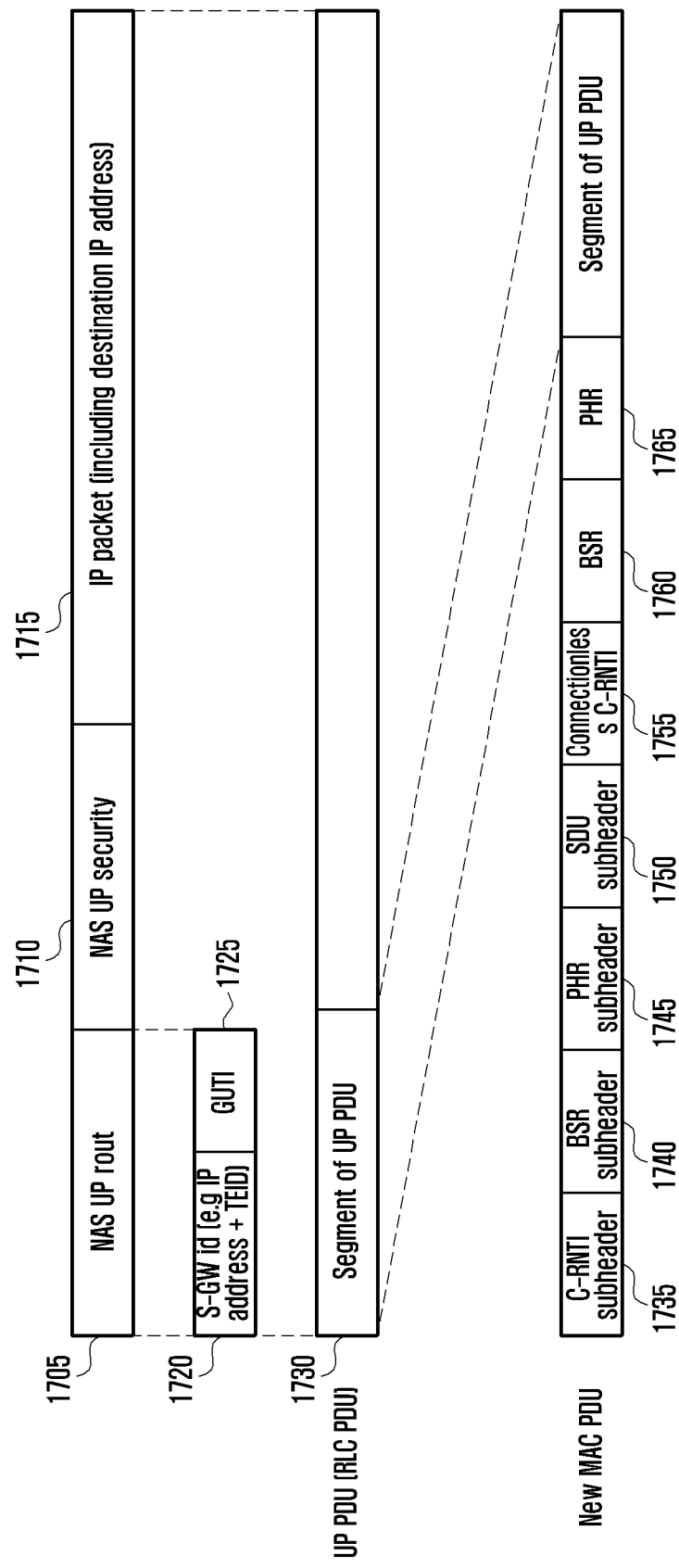
FIG. 17 is a diagram illustrating a Medium Access Control (MAC) Protocol Data Unit (PDU) formation for use in a small size packet transfer method according to the second exemplary embodiment of the present invention.

FIG. 17 is a diagram illustrating a MAC PDU formation for use in a small size packet transfer method according to the second exemplary embodiment of the present invention.

Referring to FIG. 17, a processed IP packet includes NAS routing information 1705, NAS security information 1710, and an IP packet 1715. The routing information includes S-GW id 1720 and GUTI 1725. The S-GW id indicates a specific S-GW to which the eNB forwards the IP packet. The GUTI has been described with reference to FIG. 7. The NAS security information includes KSI, MAC-I, NAS SN, and the like. The packet 1715 to be transmitted is ciphered by applying the NAS security 1710. The processed IP packet is segmented to be filled in the MAC PDU. The segmented UP PDU 1730 is filled in the MAC PDU newly defined in the present exemplary embodiment. The format of the MAC PDU includes BSR 1760, Power Headroom Report (PHR) 1765, UP PDU 1730, Connectionless C-RNTI 1755, and sub-headers 1735, 1740, 1745, and 1750 corresponding to the respective IEs. The Connectionless C-RNTI 1755 is used for the MAC PDU carrying the small size packet. A few C-RNTIs selected from the available C-RNTIs are used exclusively for the corresponding purpose. If it is determined to allow for the small size packet transfer, the UE selects a certain C-RNTI from the Connectionless C-RNTI 1755 set and includes the selected C-RNTI in the MAC PDU.

Since the Connectionless C-RNTI 1755 is selected by the UE from a specific C-RNTI set, if multiple UEs select connectionless C-RNTIs independently, this is likely to cause collision. In this case, the UEs are likely to fail packet transmission in several attempts.

Accordingly, as the number of packet transmission failures reaches a predefined value, the UE initializes the procedure to restart. When using a connectionless C-RNTI, one validity timer is applied. The UE and the eNB start a validity timer at step 1625. If there is a packet to be transmitted after the expiry of the validity timer, the validity timer is updated. This is useful to manage the connectionless C-RNTI in use.

The BSR 1760 is used to determine whether an additional UL grant is required. If it is impossible to complete transmission of the IP packet at a time, the UE transmits BSR 1760 to the eNB. If the BSR 1760 is received, the eNB determines whether an additional resource is needed. If it is determined that an additional resource is needed, the eNB sends the UE a UL grant.

The PHR 1765 can be added to assist the power control. The BSR 1760 and PHR 1765 can be added optionally according to the necessity of additional packet transmission and usability.

The UP PDU 1730 denotes the RLC PDU in an exemplary embodiment of the present invention.

The sub-headers 1735, 1740, 1745, and 1750 corresponding to the respective Connectionless C-RNTI, BSR, PHR, and UP PDU indicate the order of the IEs filled in the MAC PDU and, when the IE is variable in size, the size information of the corresponding IE is included too.

Figure 18:
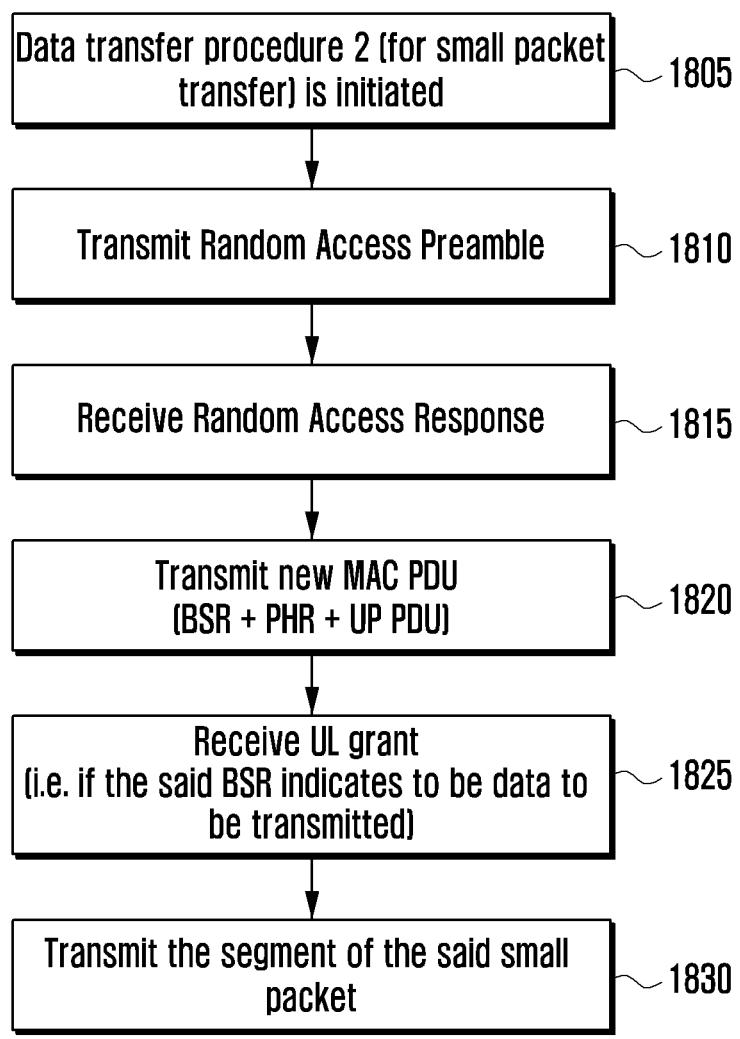
FIG. 18 is a flowchart illustrating a UE procedure according to the second exemplary embodiment of the present invention.

FIG. 18 is a flowchart illustrating a UE procedure according to the second exemplary embodiment of the present invention.

Referring to FIG. 18, in order to transfer the small size packet, the UE initializes the data transfer procedure proposed in exemplary embodiments of the present invention at step 1805. The UE sends the eNB a Random Access Preamble at step 1810. The UE receives an RAR message from the eNB at step 1815. The UE generates a MAC PDU including BSR, PHR, and UP PDU and sends the eNB the MAC PDU at step 1820. The UE receives a UL grant from the eNB at step 1825. The UE transmits the remained UP PDU at step 1830.

Figure 19:
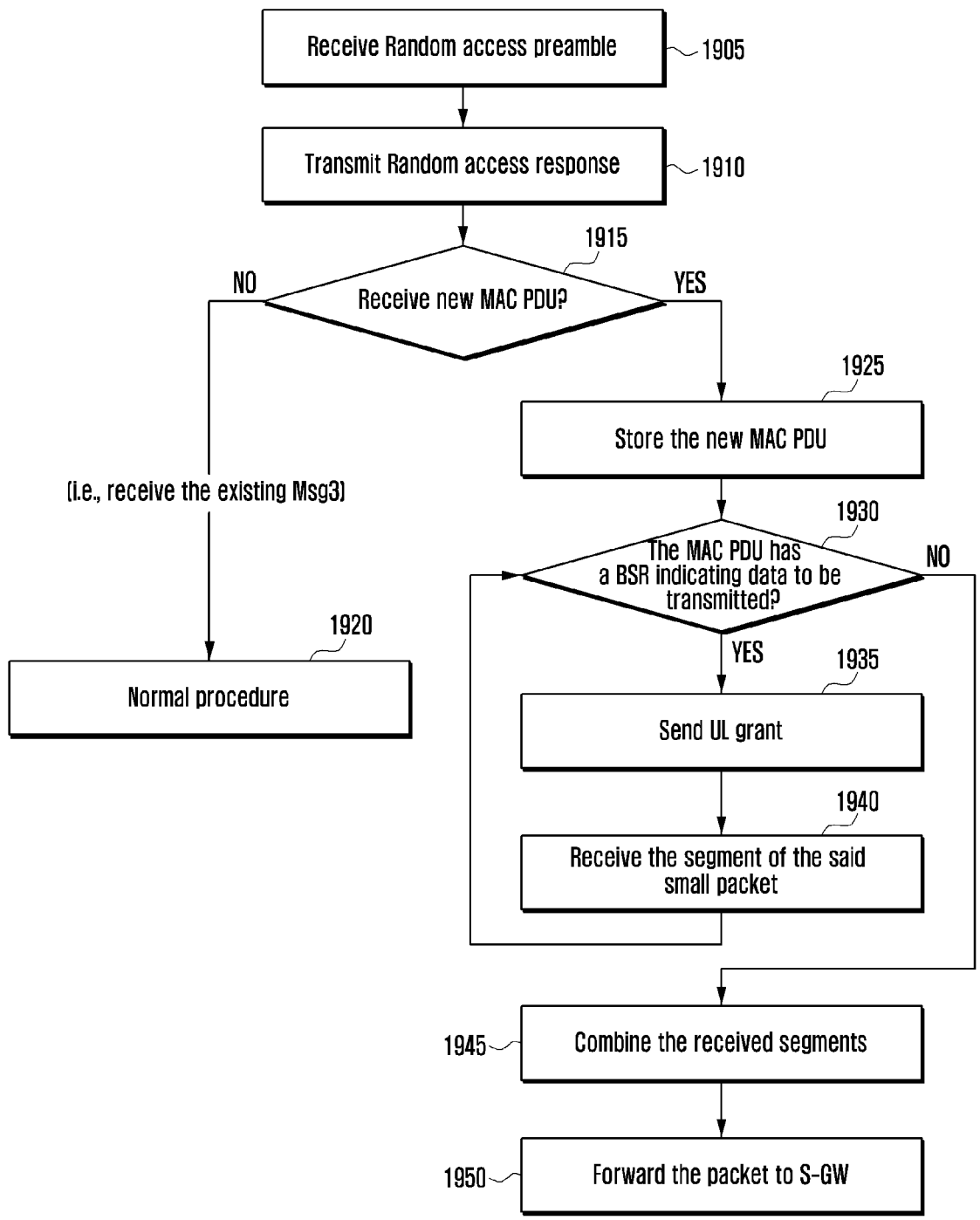
FIG. 19 is a flowchart illustrating a UE procedure according to the second exemplary embodiment of the present invention.

FIG. 19 is a flowchart illustrating a UE procedure according to the second exemplary embodiment of the present invention.

Referring to FIG. 19, an eNB receives the random access preamble transmitted by the UE at step 1905. The eNB sends the UE an RAR message at step 1910. The eNB receives the msg3 from the UE and determines whether it is the msg3 of the related art or the MAC PDU defined in this exemplary embodiment at step 1915. If the msg3 is the msg3 of the related art, the eNB performs the procedure of the related art at step 1920. The RACH procedure of the related art has been described with reference to FIG. 15. In contrast, if the msg3 is the MAC PDU defined in this exemplary embodiment, the eNB saves the new MAC PDU at step 1925. The eNB determines the BSR included in the MAC PDU to determine whether there is further data to be transmitted by the UE at step 1930. If there is further data to be transmitted, the eNB sends the UE a UL grant at step 1935. Thereafter, the eNB receives the data from the UE at step 1940. If there is no data to be transmitted by the UE, the eNB combines the received data at step 1945. The eNB then transmits the combined data to the S-GW at step 1950.

Figure 20:
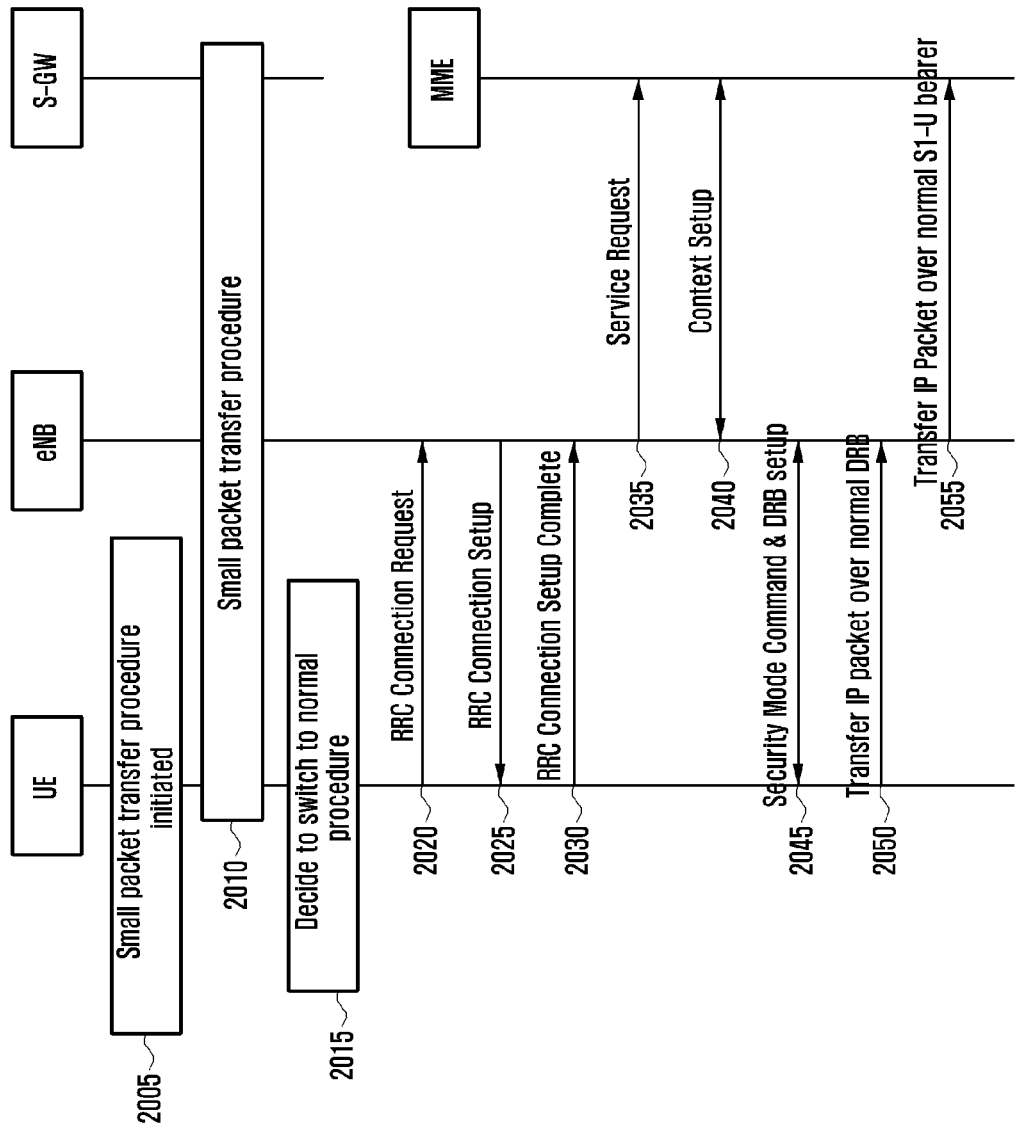
FIG. 20 is a signaling diagram illustrating a switching from a packet transfer procedure of the present invention to a packet transfer procedure of the related art according to the second exemplary embodiment of the present invention.

FIG. 20 is a signaling diagram illustrating a switching from a packet transfer procedure of the present invention to a packet transfer procedure of the related art according to the second exemplary embodiment of the present invention.

Referring to FIG. 20, a small size transfer procedure is triggered according to a predefined determination rule at step 2005. The small size packet transmission procedure is performed at step 2010. If the number of packets occurring per unit time is equal to or greater than a predefined value, the UE switches the packet transfer procedure to the packet transfer procedure of the related art at step 2015. The UE performs an RRC connection establishment procedure to transmit an RRC Connection Request message to the eNB at step 2020. The eNB sends the UE an RRC Connection Setup message at step 2025. The UE sends the eNB an RRC Connection Setup Complete message at step 2030. The eNB sends the MME a Service Request message at step 2035. The eNB and the MME perform the context setup at step 2040. The UE and the eNB apply the AS security through Security Mode Command procedure and apply the normal DRB through the RRC connection Reconfiguration message at step 2045. The UE transmits the IP packet over the normal DRB at step 2050. The eNB transmits the IP packet to the MME over the normal S1-U bearer at step 2055.

Figure 21:
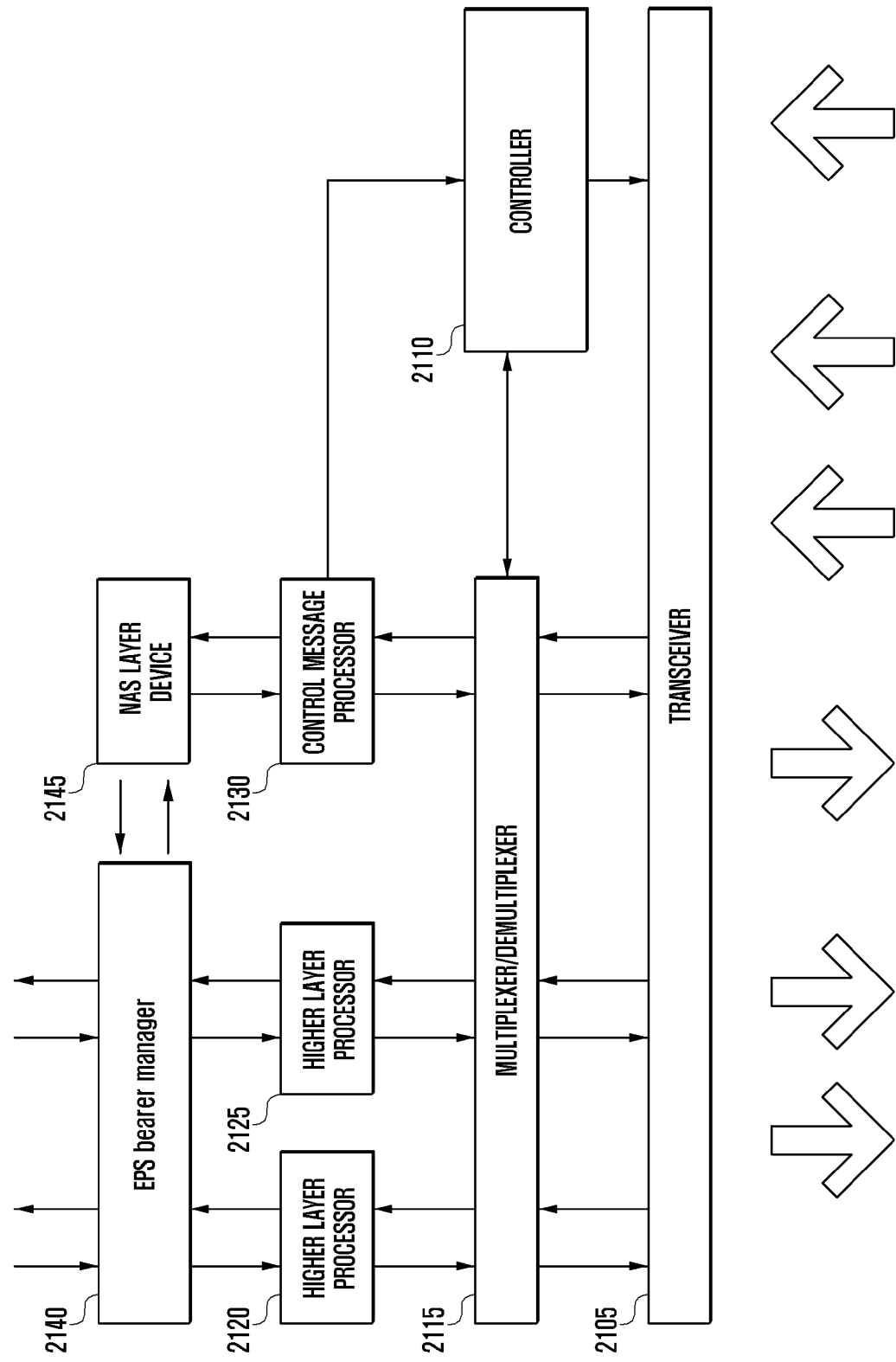
FIG. 21 is a block diagram illustrating a configuration of a UE according to an exemplary embodiment of the present invention.

FIG. 21 is a block diagram illustrating a configuration of a UE according to an exemplary embodiment of the present invention.

Referring to FIG. 21, the UE may include a transceiver 2105, a controller 2110, a multiplexer/demultiplexer 2115, a control message processor 2130, various higher layer processors 2120 and 2125, an EPS bearer manager 2140, and a NAS layer processor 2145.

The transceiver 2105 receives data and control signals through a downlink channel of the service cell and transmits data and control signals through an uplink channel. When multiple cells are configured, the transceiver 2105 performs data and control signal transmission/reception in the multiple serving cells. The multiplexer/demultiplexer 2115 multiplexes the data generated by the higher layer processors 2120 and 2125 and the control message processor 2130 and demultiplexes the data received by the transceiver 2105 and delivers the demultiplexed data to the appropriate higher layer processors 2120 and 2125 and the control message processor 2130.

The control message processor 2130 processes the control message received from the eNB by means of the RRC layer device and takes the action required. For example, if the RRC CONNECTION SETUP message is received, the control message processor 2130 configures the SRB1 and temporary DRB.

The higher layer processors 2120 and 2125 are DRB devices activated per service. The higher layer processors 2120 and 2125 process the data generated by the user service, such as a File Transfer Protocol (FTP) or a Voice over Internet Protocol (VoIP), and deliver the processed data to the multiplexer/demultiplexer 2115 or process the data provided by the multiplexer/demultiplexer 2115 and deliver the processed data to the service applications of the higher layer. A service can be mapped to an EPS bearer and a higher layer processor one by one. If a certain EPS bearer uses the data transfer procedure 2 proposed in the first or second exemplary embodiment of the present invention, a non higher layer processor is configured for the corresponding EPS bearer.

The controller 2110 determines the scheduling command, e.g., uplink grants, received through the transceiver 2105 and controls the transceiver 2105 and multiplexer/demultiplexer 2115 to perform uplink transmission using the appropriate transmission resource at appropriate timing.

The EPS bearer manager 2140 determines whether to allow for the data transfer procedure 2 and, if determined to allow for the data transfer procedure 2, delivers the IP packet to the RRC layer device or the temporary DRB device.

Figure 22:
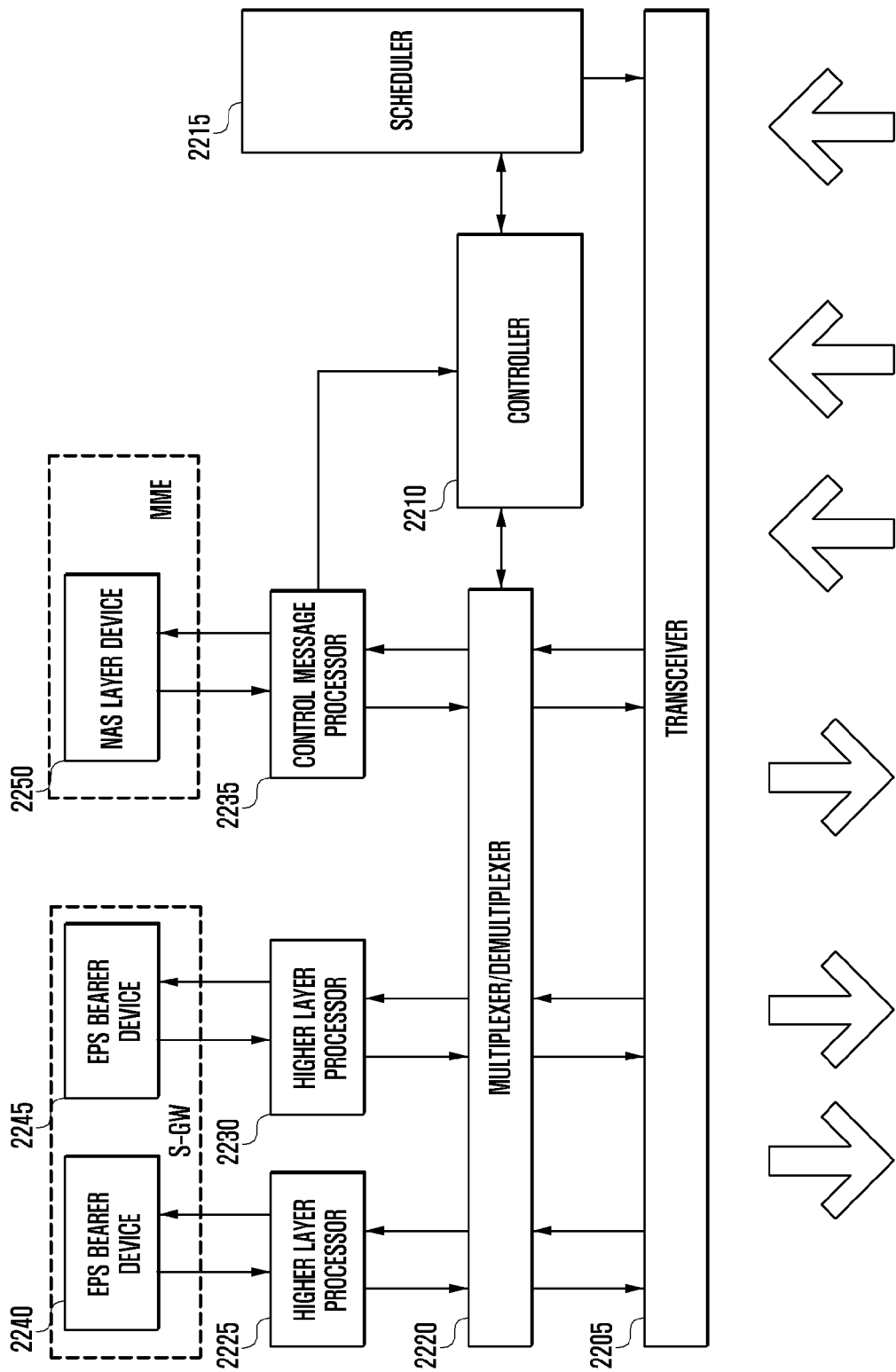
FIG. 22 is a block diagram illustrating a configuration of an eNB, a Mobility Management Entity (MME), and an S-GW according to an exemplary embodiment of the present invention.

FIG. 22 is a block diagram illustrating a configuration of an eNB, an MME, and an S-GW according to an exemplary embodiment of the present invention.

Referring to FIG. 22, a base station device may include a transceiver 2205, a controller 2210, a multiplexer/demultiplexer 2220, a control message processor 2235, various higher layer processor 2225 and 2230, a scheduler 2215, EPS bearer devices 2240 and 2245, and an NAS layer device 2250. The EPS bearer devices 2240 and 2245 are located in the S-GW, and the NAS layer device 2250 is located in the MME.

The transceiver 2205 transmits data and control signals on the downlink carrier and receives data and control signals on the uplink carrier. When multiple carriers are configured, the transceiver 2205 performs data and control signal transmission/reception on the multiple carriers.

The multiplexer/demultiplexer 2220 multiplexes the data generated by the higher layer processors 2225 and 2230 and the control message processor 2235 and demultiplexes the data received by the transceiver 2205 and delivers the demultiplexed data to the appropriate higher layer processors 2225 and 2230 and control message processor 2235 or the controller 2210. The control message processor 2235 processes the control message transmitted by the UE and generates a control message to be transmitted to the UE to the lower layer.

The higher layer processors 2225 and 2230 are capable of being activated by the EPS bearer devices 2240 and 2245 so as to deliver the data input from the EPS bearer devices 2240 and 2245 to the multiplexer/demultiplexer 2220 or configure the RLC PDU received from the multiplexer/demultiplexer 2220 into the PDCP PDU to be delivered to the EPS bearer devices 2240 and 2245.

The scheduler 2215 allocates transmission resource to the UE at an appropriate time in consideration of the UE's buffer state and channel condition and controls the transceiver 2205 to process the signal transmitted by the UE and the signal to be transmitted to the UE.

The EPS bearer devices 2240 and 2245 are activated by the higher layer processors 2225 and 2230 and process the data delivered from the higher layer processors 2250 and 2230 and transmit the processed data to the next network node.

The higher layer processors 2225 and 2230 and the EPS bearer devices 2240 and 2245 are connected to each other through S1-U bearer. The higher layer processor 2225 and 2230 corresponding to the common DRB are connected by means of the EPS bearer for the common DRB and common S1-U bearer.

The NAS layer device 2250 processes the IP packet included in the NAS message and forwards the IP packet to the S-GW.

As described above, the exemplary method and apparatus of the present invention are advantageous to efficiently transmit a small size data packet that occurs sporadically with minimum signaling overhead.

While the present invention has been shown and described with reference to exemplary embodiments thereof, it will be understood by those skilled in the art that various changes in form and details may be made therein without departing from the spirit and scope of the present invention, as defined in the appended claims and their equivalents.

What is claimed is:

1. A data transmission method of a terminal, the method comprising:
   determining whether small data transfer procedure is triggered;
   transmitting, to a base station, a radio resource control (RRC) connection request message including a temporary data radio bearer (DRB) request;
   receiving an RRC connection setup message, including a temporary DRB configuration, from the base station; and
   transmitting data via the temporary DRB.

2. The method of claim 1, wherein the temporary DRB request comprises information for not applying security between the terminal and the base station.

3. The method of claim 1, further comprising:
   configuring, when a number of next data occurring per unit time is equal to or greater than a predefined value after transmitting the data, the DRB to which the AS security is applied; and
   transmitting the next data to the base station via the DRB.

4. The method of claim 1, wherein the security between the terminal and the base station is access stratum (AS) security, and
   wherein the data is transmitted via the temporary DRB in which the AS security is not applied.

5. A data transmission method of a terminal, the method comprising:
   determining whether small data transfer procedure is triggered;
   transmitting a random access preamble to a base station;
   receiving a random access response (RAR) message from the base station; and
   transmitting, in response to the receiving of the RAR message, first data including second data received from upper layer to the base station if the small data transfer procedure is triggered.

6. The method of claim 5, wherein the first data further comprises a buffer status report (BSR), and wherein the second data comprises radio link control (RLC) PDU.

7. The method of claim 6, further comprising:
   receiving an uplink (UL) grant from the base station after transmitting the first data; and
   transmitting segments of the second data that are not transmitted in the first data,
   wherein the BSR is used for indicating whether the uplink grant is required.

8. A data reception method of a base station, the method comprising:
   receiving a radio resource control (RRC) connection request message including a temporary data radio bearer (DRB) request from a terminal;
   transmitting an RRC connection setup message including a temporary DRB configuration to the terminal; and
   receiving data transmitted by the UE via the temporary DRB in which security between the terminal and the base station is not applied.

9. The method of claim 8, wherein the security between the terminal and the base station is access stratum (AS) security, and
   wherein the temporary DRB request comprises a request for not applying AS security.

10. The method of claim 8, further comprising:
    configuring, when a number of next data occurring per unit time is equal to or greater than a predefined value after receiving the data, the DRB to which the AS security is applied; and
    receiving the next data from the terminal via the DRB.

11. A data reception method of a base station, the method comprising:
    receiving a random access preamble from a terminal;
    transmitting a random access response (RAR) message to the terminal; and
    receiving, in response to the transmitting of the RAR message, first data including second data received from upper layer from the terminal if a small data transfer procedure is triggered at the terminal.

12. The method of claim 11, wherein the first data comprises a buffer status report (BSR), and wherein the second data comprises radio link control (RLC) PDU.

13. The method of claim 12, further comprising:
    determining, based on the BSR, whether an uplink grant for data not received in the first data is required;
    transmitting, if it is determined that an uplink grant is required, the uplink grant to the terminal; and
    receiving segments of the second data not received in the first data based on the transmitted uplink grant.

14. A terminal for transmitting data, the terminal comprising:
    a transceiver configured to communicate signals with a base station; and
    a controller configured to determine whether small data transfer procedure is triggered, to transmit to a base station a radio resource control (RRC) connection request message including a temporary data radio bearer (DRB) request, to receive an RRC connection setup message including a temporary DRB configuration from the base station, and to transmitting data via the temporary DRB.

15. The terminal of claim 14, wherein the temporary DRB request comprises information for not applying security between the terminal and the base station.

16. A terminal for transmitting data, the terminal comprising:
    a transceiver configured to communicate signals with a base station; and
    a controller configured to determine whether small data transfer procedure is triggered, to transmitting a random access preamble to a base station, to receive a random access (RAR) message from the base station, and to transmit, in response to the receiving of the RAR message, first data including second data received from upper layer to the base station if the small data transfer procedure is triggered.

17. The terminal of claim 16, wherein the first data comprises a buffer status report (BSR), and wherein the second data comprises RLC PDU.

18. A base station for receiving data, the base station comprising:
    a transceiver configured to communicate signals with a terminal; and
    a controller configured to receive a radio resource control (RRC) connection request message including a temporary data radio bearer (DRB) request from a terminal, to transmit an RRC connection setup message including a temporary DRB configuration to the terminal, and to receive data transmitted by the UE via the temporary DRB in which security between the terminal and the base station is not applied.

19. The base station of claim 18, wherein the security between the terminal and the base station is access stratum (AS) security, and
wherein the temporary DRB request comprises a request for not applying AS security.

20. A base station for receiving data, the base station comprising:
a transceiver configured to communicate signals with the terminal; and
a controller configured to receive a random access preamble from the terminal, to transmit a random access response (RAR) message to the terminal, and to receive, in response to the transmitting of the RAR message, first data including second data received from upper layer from a terminal if a small data transfer procedure is triggered at the terminal.

\* \* \* \* \*